United States Patent
Yamamoto et al.

(10) Patent No.: US 10,359,683 B2
(45) Date of Patent: Jul. 23, 2019

(54) PORTABLE ATTACHMENT AND COMMUNICATION SYSTEM

(71) Applicant: Sony Corporation, Tokyo (JP)

(72) Inventors: Masaaki Yamamoto, Chiba (JP); Yoichi Ito, Tokyo (JP); Yuki Sugiue, Tokyo (JP); Machiko Takematsu, Kanagawa (JP); Masakazu Mitsugi, Kanagawa (JP); Hiroshi Saeki, Tokyo (JP)

(73) Assignee: Sony Corporation, Tokyo (JP)

( * ) Notice: Subject to any disclaimer, the term of this patent is extended or adjusted under 35 U.S.C. 154(b) by 350 days.

(21) Appl. No.: 15/306,817

(22) PCT Filed: May 28, 2015

(86) PCT No.: PCT/JP2015/065396
§ 371 (c)(1),
(2) Date: Oct. 26, 2016

(87) PCT Pub. No.: WO2015/182701
PCT Pub. Date: Dec. 3, 2015

(65) Prior Publication Data
US 2017/0045797 A1    Feb. 16, 2017

(30) Foreign Application Priority Data

Sep. 4, 2012   (JP) .................................. 2014-180537
May 30, 2014   (JP) .................................. 2014-113288
Nov. 5, 2014   (JP) .................................. 2014-225189

(51) Int. Cl.
*G02B 26/00*     (2006.01)
*G02F 1/167*     (2019.01)
(Continued)

(52) U.S. Cl.
CPC ............... *G02F 1/167* (2013.01); *A41B 1/08* (2013.01); *A41D 1/00* (2013.01); *A41D 23/00* (2013.01);
(Continued)

(58) Field of Classification Search
CPC ............................ G02F 1/167; G02F 1/13306
See application file for complete search history.

(56) References Cited

U.S. PATENT DOCUMENTS

2001/0043164 A1    11/2001   Thagard et al.
2007/0197115 A1*    8/2007   Eves ................... D03D 1/0088
                                                442/194
(Continued)

FOREIGN PATENT DOCUMENTS

JP          03-027714 U        3/1991
JP          2001032105 A       2/2001
(Continued)

OTHER PUBLICATIONS

International Search Report from PCT/JP2015/065396, dated Aug. 18, 2015.

*Primary Examiner* — Joseph P Martinez
(74) *Attorney, Agent, or Firm* — Lerner, David, Littenberg, Krumholz & Mentlik, LLP

(57) ABSTRACT

The present disclosure relates to a portable attachment and communication system that enable a desired image to be displayed with flexibility and lower power consumption in an article worn or carried by a human.
The portable attachment is an article including a display body made of an electrophoretic display, the article being carried or worn by a user. The present disclosure can be applied to, for example, a portable attachment, etc. Examples of the portable attachment carried by a user are a (Continued)

bag, a wallet, a key holder, etc. Examples of the portable attachment worn by the user are a hair accessory, a tie, a watch, clothing, etc.

19 Claims, 42 Drawing Sheets

(51) Int. Cl.
| | | |
|---|---|---|
| | *A41D 23/00* | (2006.01) |
| | *A41D 25/00* | (2006.01) |
| | *A41F 3/00* | (2006.01) |
| | *A41F 9/00* | (2006.01) |
| | *A45C 13/08* | (2006.01) |
| | *A41D 1/00* | (2018.01) |
| | *A41B 1/08* | (2006.01) |
| | *A44C 5/00* | (2006.01) |
| | *A44C 7/00* | (2006.01) |
| | *A44C 25/00* | (2006.01) |
| | *G02F 1/133* | (2006.01) |
| | *G09G 3/34* | (2006.01) |

(52) U.S. Cl.
CPC ................ *A41D 25/00* (2013.01); *A41F 3/00* (2013.01); *A41F 9/00* (2013.01); *A44C 5/0007* (2013.01); *A44C 7/00* (2013.01); *A44C 25/007* (2013.01); *A45C 13/08* (2013.01); *G02F 1/13306* (2013.01); *G09G 3/344* (2013.01); *G09G 2380/02* (2013.01)

(56) References Cited

U.S. PATENT DOCUMENTS

2007/0285385 A1\* 12/2007 Albert ................... G06F 3/147
　　　　　　　　　　　　　　　　　　　　　　　　　345/107
2010/0185501 A1　　 7/2010 Chou et al.

FOREIGN PATENT DOCUMENTS

| JP | 2003177693 A | 6/2003 |
|---|---|---|
| JP | 2003526817 | 9/2003 |
| JP | 2004068181 A | 3/2004 |
| JP | 2004145119 A | 5/2004 |
| JP | 2005039625 A | 2/2005 |
| JP | 2008233590 A | 10/2008 |
| JP | 2010164928 A | 7/2010 |
| JP | 2011185994 A | 9/2011 |
| JP | 2012003386 A | 1/2012 |
| JP | 2012022296 A | 2/2012 |
| WO | 2006082971 A1 | 8/2006 |

\* cited by examiner

FIG. 18

|   |   |   |   |   |   |
|---|---|---|---|---|---|
| 1 | 2 | 1 | 2 | 1 | 2 |
| 3 | 4 | 3 | 4 | 3 | 4 |
| 1 | 2 | 1 | 2 | 1 | 2 |
| 3 | 4 | 3 | 4 | 3 | 4 |
| 1 | 2 | 1 | 2 | 1 | 2 |
| 3 | 4 | 3 | 4 | 3 | 4 |
| 1 | 2 | 1 | 2 | 1 | 2 |
| 3 | 4 | 3 | 4 | 3 | 4 |
| 1 | 2 | 1 | 2 | 1 | 2 |
| 3 | 4 | 3 | 4 | 3 | 4 |

FIG. 21

| 2 | 1 | 2 | 1 | 2 | 1 | 2 | 1 |
|---|---|---|---|---|---|---|---|
| 4 | 2 | 1 | 3 | 4 | 2 | 1 | 3 |
| 2 | 4 | 3 | 1 | 2 | 4 | 3 | 1 |
| 4 | 3 | 4 | 3 | 4 | 3 | 4 | 3 |
| 2 | 1 | 2 | 1 | 2 | 1 | 2 | 1 |
| 4 | 2 | 1 | 3 | 4 | 2 | 1 | 3 |
| 2 | 4 | 3 | 1 | 2 | 4 | 3 | 1 |
| 4 | 3 | 4 | 3 | 4 | 3 | 4 | 3 |

PORTABLE ATTACHMENT AND COMMUNICATION SYSTEM

CROSS-REFERENCE TO RELATED APPLICATIONS

This application is a national phase entry under 35 U.S.C. § 371 of International Application No. PCT/JP2015/065396 filed May 28, 2015, which claims the priority from Japanese Patent Application No. 2014-113288, filed in the Japanese Patent Office on May 30, 2014; Japanese Patent Application No. 2014-180537, filed in the Japanese Patent Office on Sep. 4, 2014; and Japanese Patent Application No. 2014-225189, filed in the Japanese Patent Office on Nov. 5, 2014, the disclosures of which are incorporated herein by reference.

TECHNICAL FIELD

The present disclosure relates to a portable attachment and a communication system and particularly to a portable attachment and a communication system capable of displaying a desired image with flexibility and low power consumption.

BACKGROUND ART

There is technology which enables any information to be displayed by attaching a display to clothing worn by a human (e.g., see Patent Literatures 1 to 3). Also, one such display is an electrophoretic display (e.g., see Patent Literatures 4 and 5).

CITATION LIST

Patent Literature

Patent Literature 1: JP 2001-32105A
Patent Literature 2: JP 2003-177693A
Patent Literature 3: JP 2004-145119A
Patent Literature 4: JP 2003-526817A
Patent Literature 5: JP 2012-22296A

SUMMARY OF INVENTION

Technical Problem

To satisfy fashionability for a display of an article worn or carried by a human, the flexibility of the display is considered to be important. Also, when an article is worn or carried by a human, low power consumption is also considered to be important due to the difficulty of securing a power supply.

The present disclosure has been made in view of such circumstances and enables a desired image to be displayed with flexibility and lower power consumption in an article worn or carried by a human.

Solution to Problem

According to a first aspect of the present disclosure, a portable attachment is an article including a display body made of an electrophoretic display, the article being carried or worn by a user.

According to the first aspect of the present disclosure, a portable attachment is provided with a display body made of an electrophoretic display, the portable attachment being carried or worn by a user.

According to a second aspect of the present disclosure, a communication system includes: a portable attachment that is an article carried or worn by a user; and a terminal apparatus. The portable attachment includes a communication unit configured to wirelessly communicate with the terminal apparatus, and a display body made of an electrophoretic display and configured to perform display based on data received by the communication unit, and the terminal apparatus transmits the data to the communication unit.

In the communication system of the second aspect of the present disclosure, data transmitted from the terminal apparatus is received by the communication unit of the portable attachment and display based on the received data is performed in the display body constituted of the electrophoretic display.

Advantageous Effects of Invention

According to the first and second aspects of the present disclosure, a desired image can be displayed with flexibility and lower power consumption in an article worn or carried by a human.

Note that the effects described here are not necessarily limited, and any effect that is desired to be described in the present disclosure may be exhibited.

BRIEF DESCRIPTION OF DRAWINGS

FIG. 18 is a diagram illustrating a configuration example of a display body which enables display of FIG. 17.

FIG. 21 is a diagram illustrating a configuration example of a display body which enables display of FIG. 17.

DESCRIPTION OF EMBODIMENT(S)

Hereinafter, modes for carrying out the present disclosure (hereinafter referred to as embodiments) will be described. The description will be given in the following order.

1. First embodiment (configuration example of portable attachment having switch unit)
2. Second embodiment (configuration example of portable attachment having sensor)
3. Third embodiment (configuration example of portable attachment from which control terminal is separated)
4. Fourth embodiment (configuration example of portable attachment having communication unit)
5. Example of display body with three-dimensional shape
6. Application examples applied to various types of articles 1. First Embodiment Configuration Example of Portable Attachment FIG. 1 is a block diagram illustrating a configuration example of the first embodiment of the portable attachment according to the present disclosure.

Figure 1:
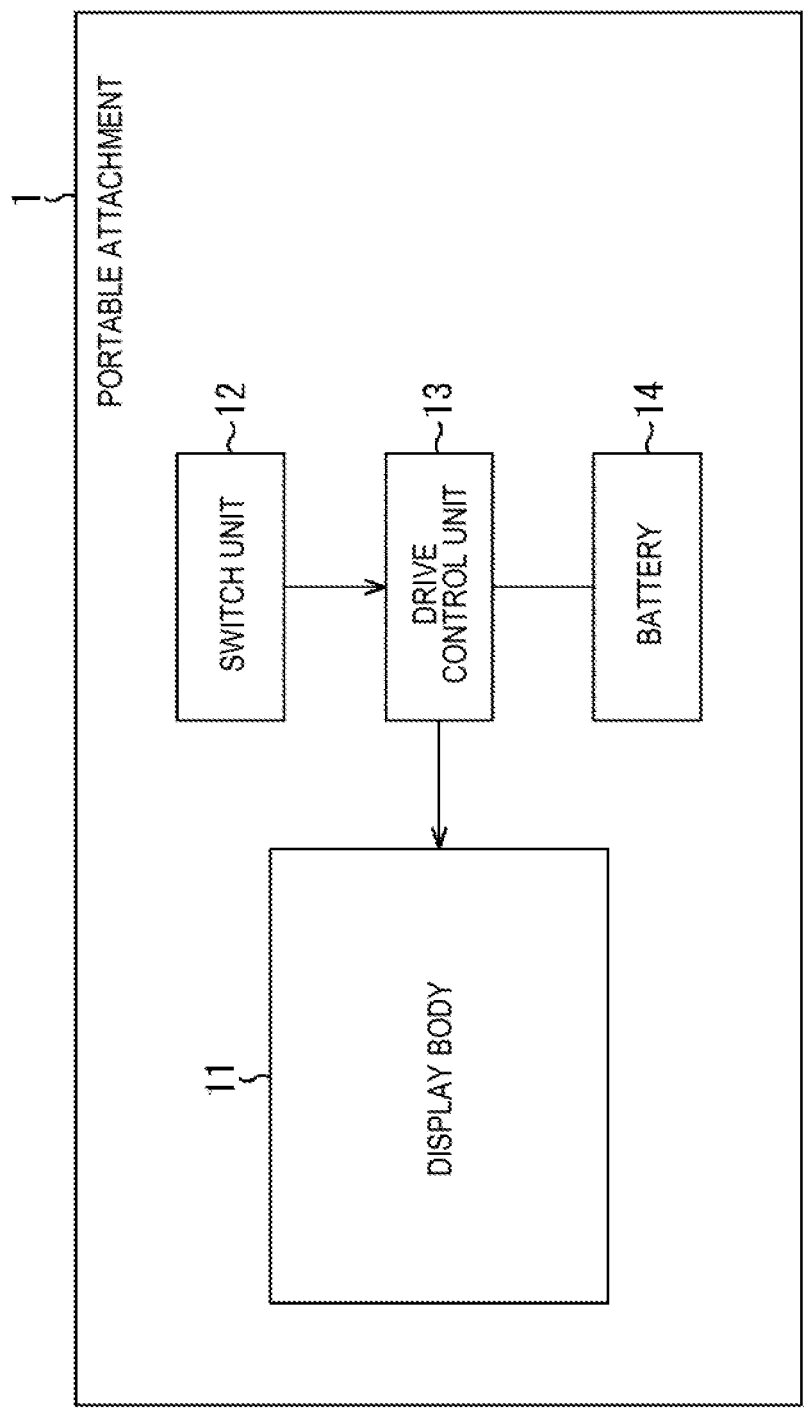
FIG. 1 is a block diagram illustrating a configuration example of a first embodiment of a portable attachment according to the present disclosure.

The portable attachment 1 illustrated in FIG. 1 is an article carried or worn by a user (a human), and includes a display body (a display unit) 11 in which an image is changeable, a switch unit 12, a drive control unit 13, and a battery 14.

Examples of the portable attachment 1 carried by the user are a bag, a wallet, a smartphone case, a key holder, a charm (a small article) attached to a bag, a fan, a pass case, a card case, etc. On the other hand, examples of the portable attachment 1 worn by the user are piercings, earrings, a hair accessory, a belt, glasses, a bangle (a bracelet), a tie (including a bow tie), a tie pin, suspenders, a muffler, a scarf, a stole, a shawl, shoes, a watch, clothing such as a T-shirt, mobile devices such as a smartphone and a headphone, a mobile device case (a cover), etc.

The display body 11 includes a flexible display in which a form such as a curve shape can be flexibly deformed and performs predetermined display on the basis of control from the drive control unit 13. More specifically, the display body 11 includes an electrophoretic display which is also referred to as so-called electronic paper or an electronic paper display (EPD).

A feature of the electrophoretic display is low power consumption. That is, the electrophoretic display does not require a backlight necessary for a liquid crystal display (LCD). Also, it is necessary for the electrophoretic display to cause an electric current to flow only when display is switched. In the electrophoretic display, an electric current need not flow to maintain the display. Thus, the electrophoretic display can perform the display at extremely lower power consumption than the LCD or the like.

Also, another feature of the electrophoretic display is flexibility. That is, the electrophoretic display has an ultra-thin film shape and a shape of the electrophoretic display can be deformed with a certain degree of freedom.

The switch unit 12 includes, for example, a button switch, a slide switch, or the like, detects an ON/OFF operation by the user, and supplies the drive control unit 13 with a state signal of an ON state or an OFF state in correspondence with the detected operation. As the switch unit 12, a touch sensor is provided on a surface of the display body 11 and can detect the user's touch (contact) as an ON/OFF operation.

Figure 2:
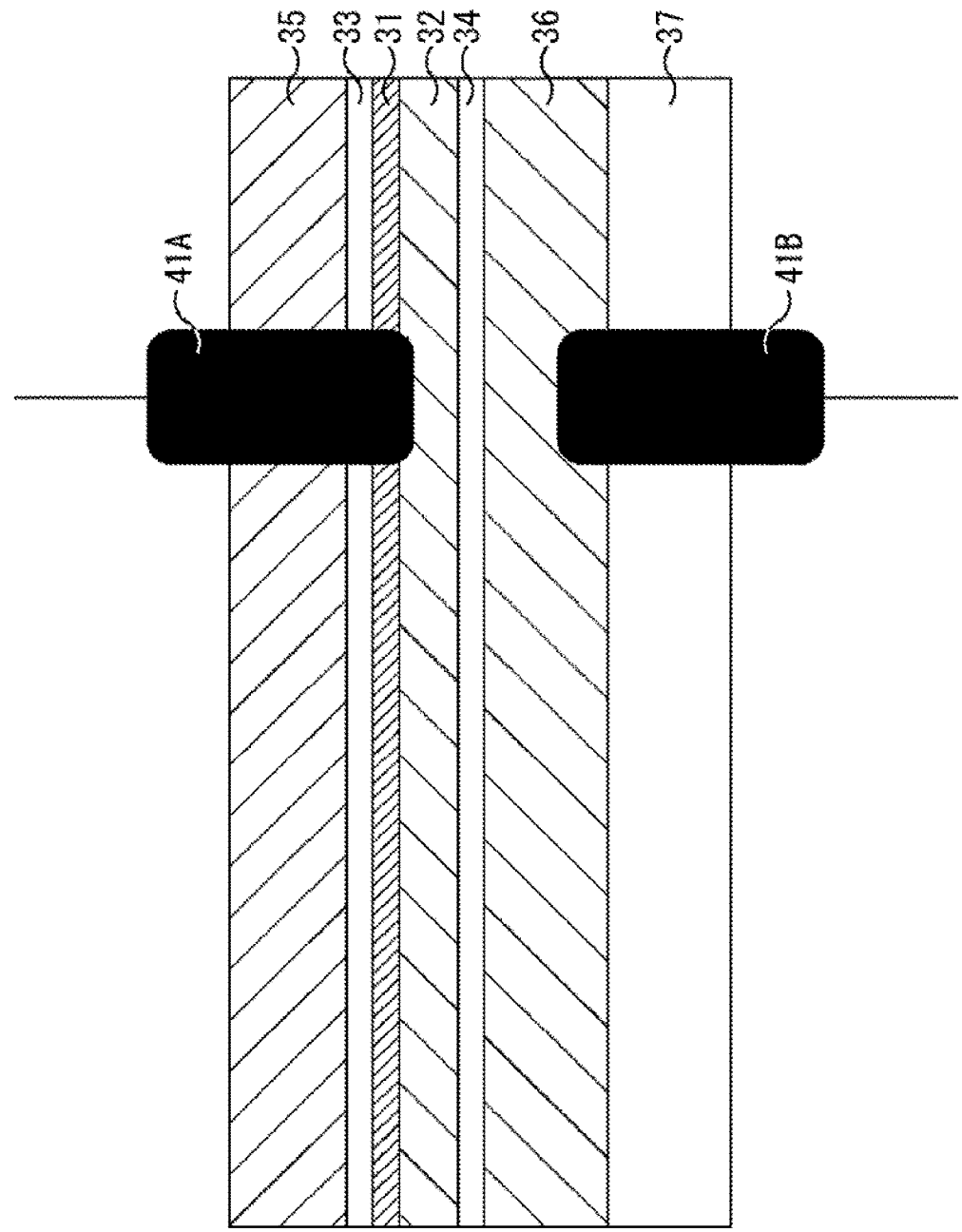
FIG. 2 is a diagram illustrating a structure example of a display body.

The drive control unit 13 drives the display body 11 on the basis of the state signal supplied from the switch unit 12 using power supplied from the battery 14. The drive control unit 13 can be implemented by executing drive software which drives the electrophoretic display serving as the display body 11 using, for example, a microcomputer, a central processing unit (CPU), or the like Configuration Example of Display Unit FIG. 2 is a diagram illustrating a structure example of the display body 11 which is a flexible display.

The display body 11 has a structure in which a microencapsulation layer 31 and a transparent electrode layer 32 are sandwiched by transparent resin protection layers 33 and 34 and a red color filter 35 is further laminated on an upper side of the transparent resin protection layer 33 which is a surface side viewed by the user. Also, an electrode layer 36 and a transparent resin protection layer 37 are further laminated on a lower side of the transparent resin protection layer 34 opposite to the surface side. The electrode layer 36 is constituted of, for example, a metallic electrode film such as molybdenum.

Also, similar to the transparent electrode layer 32, the electrode layer 36 can also be a transparent electrode layer (e.g., indium tin oxide (ITO)). If the transparent electrode layer is used as the electrode layer 36, for example, the color of the surface side is white and the color of the rear side is black, so that different colors are viewed on the surface side and the rear side. Thus, a reversible structure capable of being viewed from both the surface side and the rear side of the display body 11 is formed and therefore there is an advantageous effect that fashionability is improved. When the transparent electrode layer is used as the electrode layer 36, a desired color can be displayed by forming a color filter between the electrode layer 36 and the transparent resin protection layer 37 or on the transparent resin protection layer 37 as in the surface side.

Two connection ports 41A and 41B are connected to the display body 11. Specifically, one connection port 41A is connected to the transparent electrode layer 32 in contact with the micro-encapsulation layer 31 and the other connection port 41B is connected to the electrode layer 36.

Although the connection ports 41A and 41B are configured to penetrate through a predetermined layer (e.g., the color filter 35) in FIG. 2, it is unnecessary for the present disclosure to be limited thereto. A method of connecting the drive control unit 13 and the display body 11 using, for example, a flexible print substrate or the like, as used in a general display may be used.

In the micro-encapsulation layer 31, microcapsules containing one or more particles are filled within a transparent solution. For example, if two particles, a white particle and a black particle, are filled within a microcapsule of the micro-encapsulation layer 31, the negatively charged white particle is collected toward the transparent electrode layer 32 of the micro-encapsulation layer 31 and the positively charged black particle is collected toward the surface side (the color filter 35), for example, when a positive voltage is applied to the transparent electrode layer 32 according to control of the drive control unit 13, and therefore (the color) black is displayed. In contrast, when a negative voltage is applied to the transparent electrode layer 32, the black particle is collected toward the transparent electrode layer 32 of the micro-encapsulation layer 31 and the white particle is collected toward the surface side, and therefore (the color) red is displayed.

Accordingly, the display body 11 can perform a display operation of switching the entire display area to red or black according to control of the drive control unit 13.

Also, although red or black is displayed because a red color filter 35 is laminated on an uppermost surface of the display body 11 in the configuration of FIG. 2, white or black is monochromatically displayed if no color filter 35 is laminated.

Further, for example, when a green color filter 35 has been laminated on the uppermost surface of the display body 11, green or black is displayed.

Also, the electrophoretic display can represent intermediate gradations of white and black in a predetermined number of gradations (e.g., 16 gradations) by changing a drive voltage in a plurality of steps. Therefore, if intermediate gradation control is adopted, gradations of intermediate concentrations of red and black can also be displayed in the display body 11 on which the red color filter 35 is laminated.

Also, it is unnecessary for the display body 11 to be limited to the above-mentioned microcapsule scheme and, for example, a display body of a scheme disclosed in Patent Literature 4 or 5 or the like may be used. Further, the display body 11 may be based on a scheme known as a display scheme of electronic paper other than an electrophoretic scheme. That is, the scheme is not limited as long as any electronic paper capable of electrically rewriting display content is provided among display media having visibility or portability which is an advantage of paper as the display body 11 of the present disclosure.

Application Example for Bangle

Figure 3:
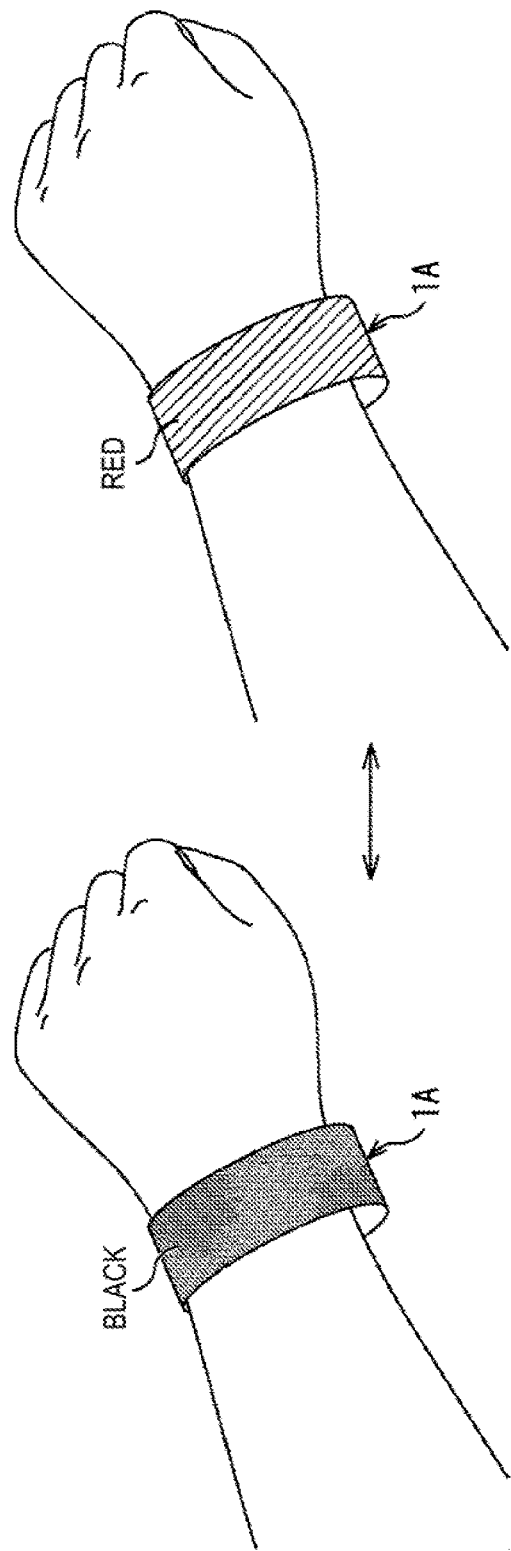
FIG. 3 is a diagram illustrating a display example when the portable attachment is a bangle.

FIG. 3 illustrates a display example when the portable attachment 1 is a bangle.

The user operates the switch unit 12 (not illustrated) and therefore the bangle 1A serving as the portable attachment 1 becomes red or black as illustrated in FIG. 3.

Figure 4:
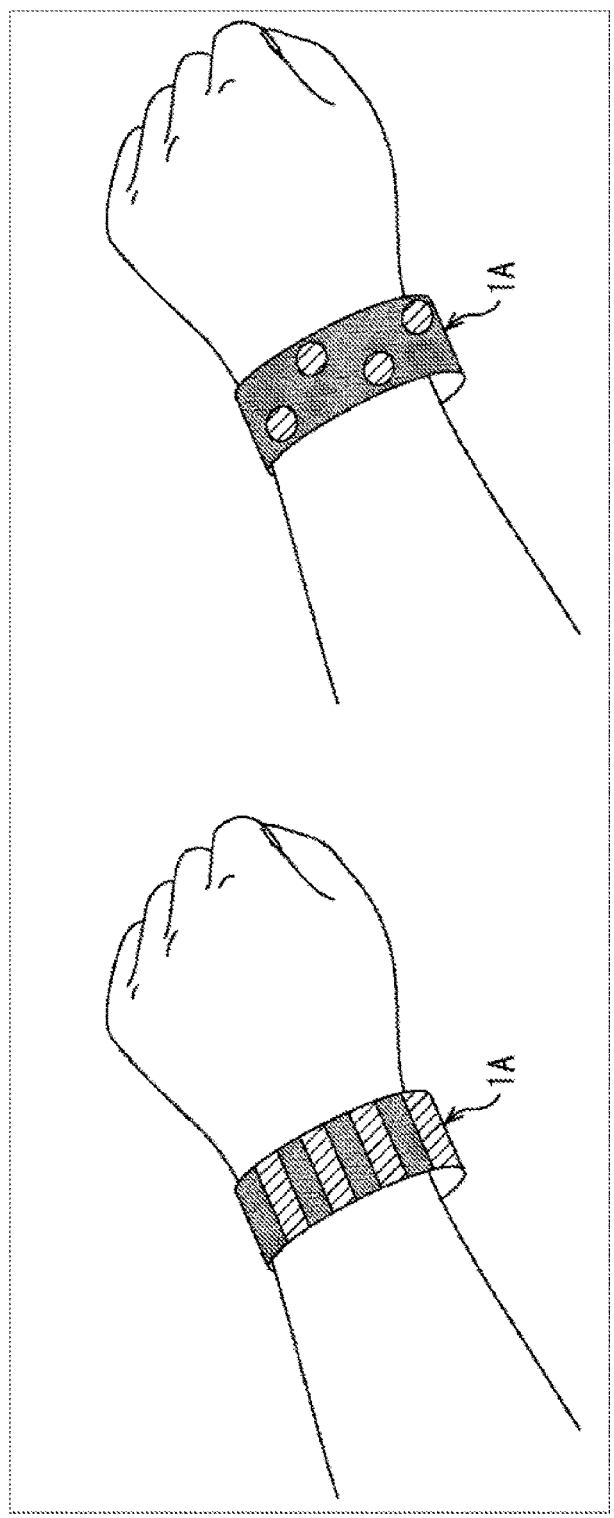
FIG. 4 is a diagram illustrating a display example when the portable attachment is a bangle.

FIG. 3 is an example in which the entire display area of the display body 11 is one control unit area (segment), but pattern shapes such as stripes and polka dots are also possible as illustrated in FIG. 4 by providing, for example, two control unit areas. Three or more control unit areas may be provided and the pattern need not be a repeated pattern as in FIG. 4.

In addition, active matrix control in which the entire display area is two-dimensionally divided into a plurality of pixels and the divided pixels are turned ON/OFF as units of control is also possible in the electrophoretic display. As in the LCD or the like, it is possible to display any image in full color by arranging an R, G, or B color filter 35 in each pixel and performing the active matrix control.

Application Example for Bag

Next, an example in which the portable attachment 1 is a bag will be described.

Figure 5:
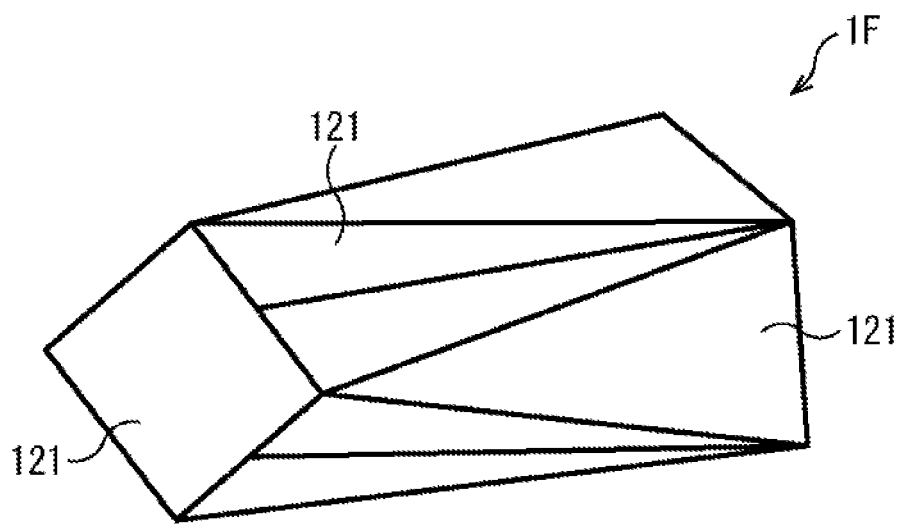
FIG. 5 is a perspective view of a bag serving as the portable attachment.
Figure 6:
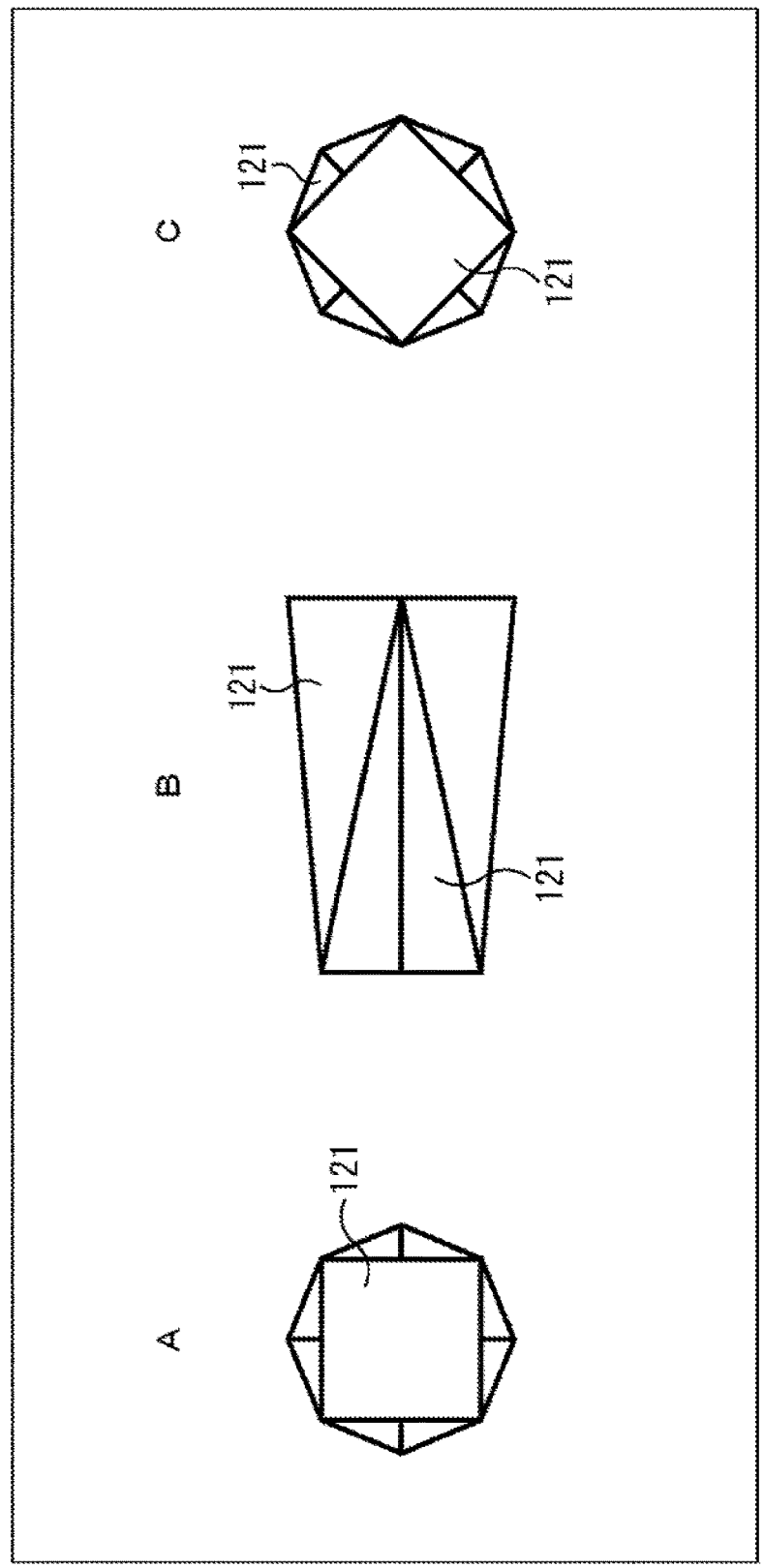
FIG. 6 is a front view and a side view of the bag serving as the portable attachment.

FIG. 5 is a perspective view of the bag 1F serving as the portable attachment 1, A of FIG. 6 is a left side view of the bag 1F, B of FIG. 6 is a front view of the bag 1F, and C of FIG. 6 is a right side view of the bag 1F.

The bag 1F has a polyhedral shape in which triangular and quadrangular surfaces 121 are combined and connected. An E-paper element ha (FIG. 8) is attached to each of the triangular and quadrangular surfaces 121 and each surface 121 independently displays white or black.

Figure 7:
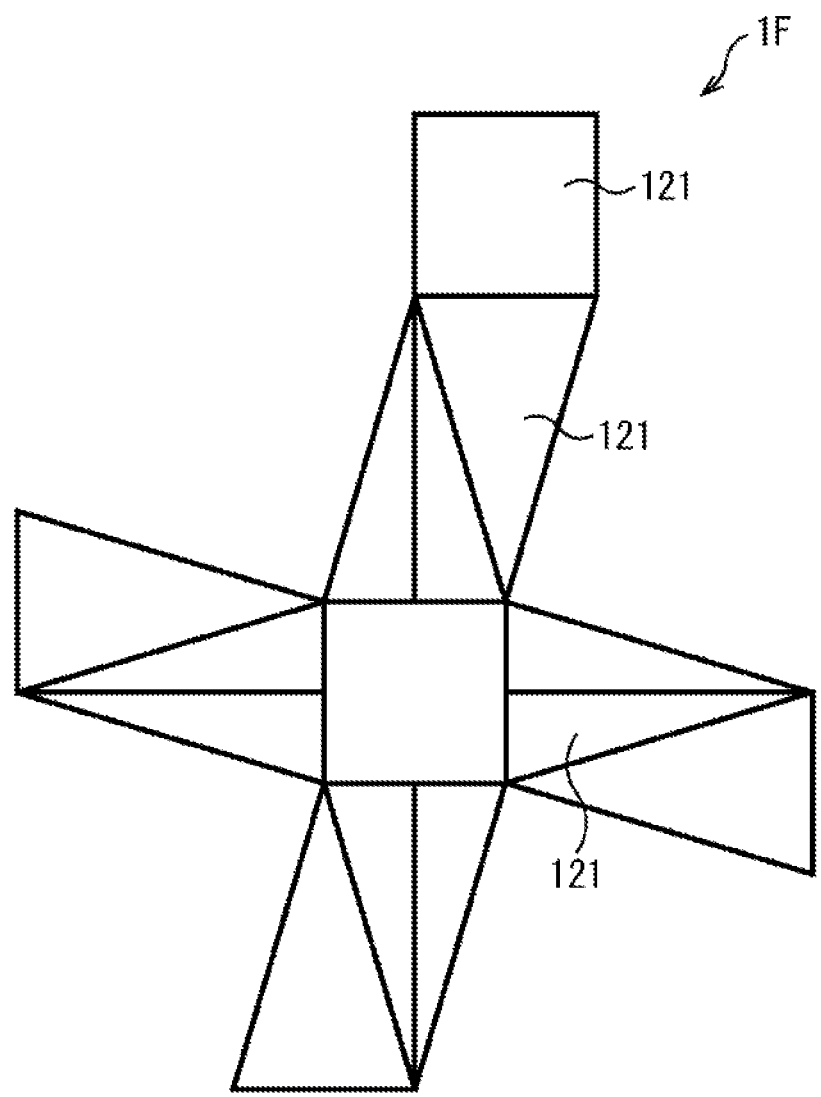
FIG. 7 is an opened view of the bag serving as the portable attachment.

The bag 1F can be deformed to a planar shape as illustrated in FIG. 7 by separating connections between predetermined surfaces 121. FIG. 7 is an opened view when the bag 1F is deformed to the planar shape. The surfaces 121 capable of being separated are connected by, for example, magnets or the like. Connection portions between the surfaces 121 which cannot be separated can be bent within a predetermined range so that the connection portions can be deformed to a polyhedral shape and a planar shape.

The bag 1F is used in a state in which the bag 1F is assembled in a three-dimensional shape as illustrated in FIG. 5. On the other hand, when the bag 1F is not used such as when the bag 1F is in storage, the bag 1F is deformed to the planar shape as in FIG. 7. Thereby, space efficiency or portability can be improved when the bag 1F is not used as the bag.

Block Diagram of Bag

Figure 8:
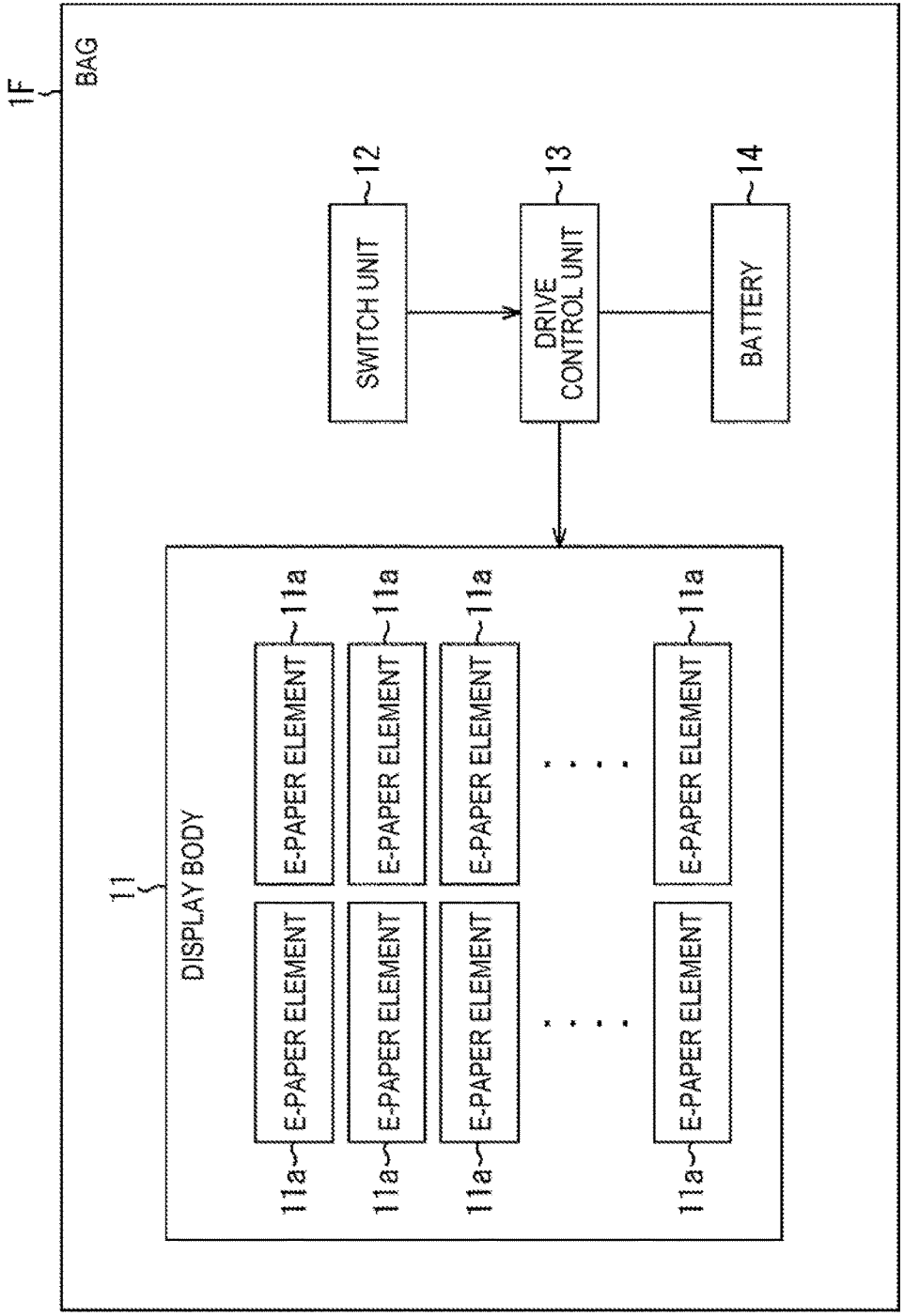
FIG. 8 is a block diagram illustrating a configuration example of the bag.

FIG. 8 is a block diagram illustrating a further detailed configuration example of the bag 1F.

In FIG. 8, parts corresponding to those of FIG. 1 are denoted by the same reference signs. Description of parts overlapping the above description will be appropriately omitted.

The display body 11 includes a plurality of E-paper elements 11a. One E-paper element 11a corresponds to one surface 121 of FIG. 7. The drive control unit 13 controls an applied voltage applied to each of the plurality of E-paper elements ha. Thereby, it is possible to independently change the colors of the plurality of surfaces 121 of the bag 1F.

The switch unit 12 is provided on the backside of a predetermined surface 121 among the plurality of surfaces 121 constituting the bag 1F, in other words, the inside of the bag 1F when the bag 1F is assembled in a three-dimensional shape.

Action Detection Process

Figure 9:
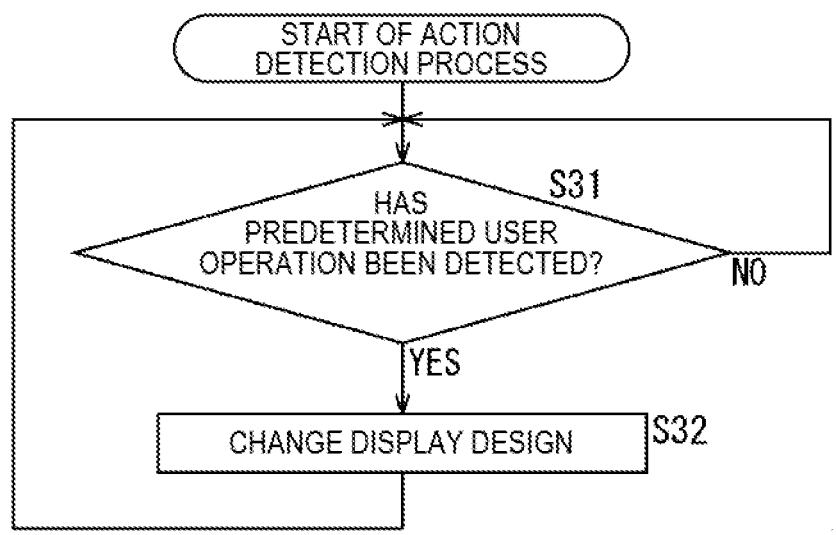
FIG. 9 is a flowchart illustrating an action detection process.

FIG. 9 is a flowchart of the action detection process of detecting a button operation of the user and changing the display of each surface 121 of the bag 1F.

In the action detection process, initially, the drive control unit 13 determines whether the user operation has been detected on the basis of a signal supplied from the switch unit 12 in step S31.

For example, the switch unit 12 is constituted of a button switch and a plurality of types of user operations such as an operation of pressing the button switch and a long press operation for a fixed time (e.g., 3 sec) in the bag 1F are predetermined. The user can instruct the bag 1F to change the display by performing a predetermined user operation.

The process of step S31 is iterated until it is determined that the predetermined user operation has been detected in step S31.

When it is determined that the predetermined user operation has been detected in step S31, the process proceeds to step S32 and the drive control unit 13 controls the drive of the plurality of E-paper elements 11a corresponding to the plurality of surfaces 121 constituting the bag 1F and changes a display design of the bag 1F.

Figure 10:
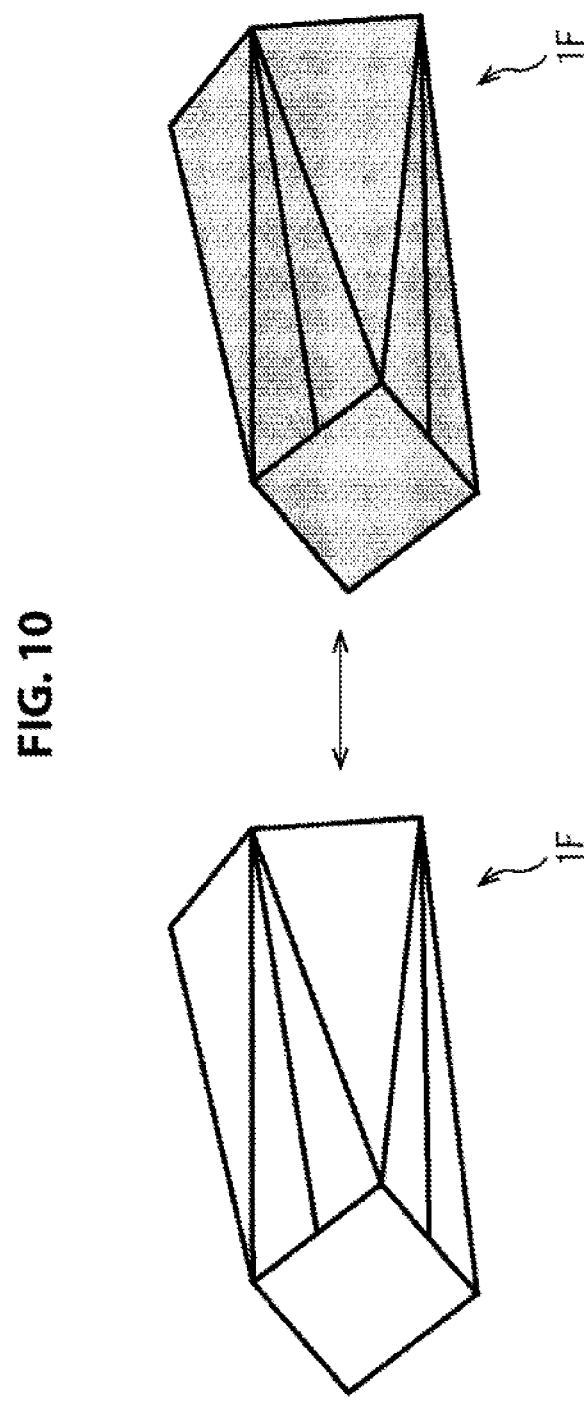
FIG. 10 is a diagram illustrating a change example of a display design in the action detection process.
Figure 11:
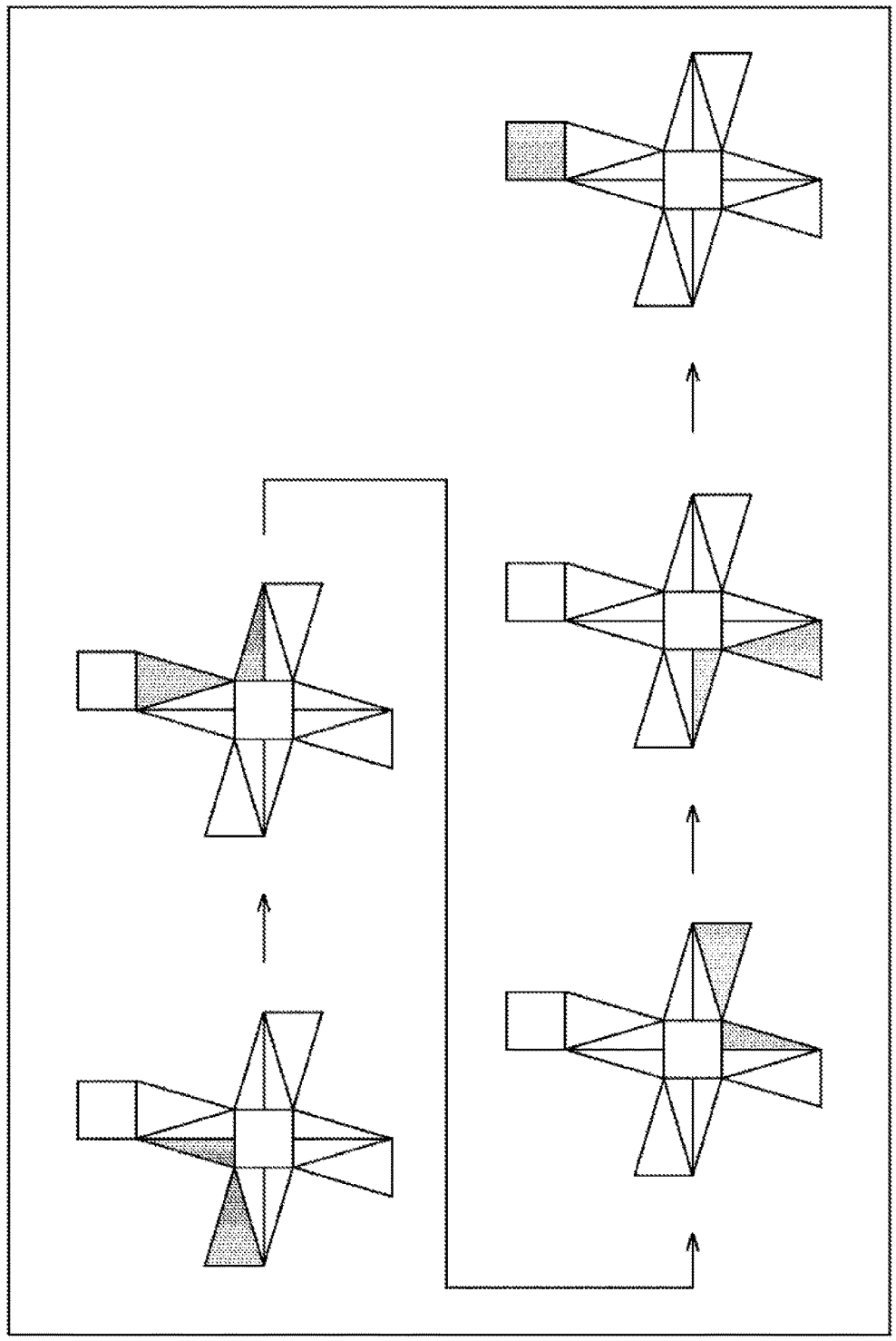
FIG. 11 is a diagram illustrating a change example of a display design in the action detection process.

FIGS. 10 and 11 illustrate change examples of the display design of the bag 1F.

For example, when a user operation of pressing the switch unit 12 has been detected, the drive control unit 13 changes the display so that all the surfaces 121 of the bag 1F are white or black as illustrated in FIG. 10. If a current state of the bag 1F is the case in which all the surfaces 121 display white, the drive control unit 13 changes the display so that all the surfaces 121 of the bag 1F become black. If the current state of the bag 1F is the case in which all the surfaces 121 display black, the drive control unit 13 changes the display so that all the surfaces 121 of the bag 1F become white.

Also, for example, when a user operation of pressing the switch unit 12 for a fixed time has been detected, the drive control unit 13 changes the display to sequentially show surfaces 121 to be connected among the plurality of surfaces 121 constituting the bag 1F to provide guidance for an assembly procedure of assembling the bag 1F from the planar shape to the three-dimensional shape (the polyhedral shape) as illustrated in FIG. 11. By providing this display function, the bag 1F can be intuitively assembled and a description for describing the assembly procedure is unnecessary.

When the process of step S32 ends, the process returns to step S31 and the above-mentioned process is iterated.

As described above, it is possible to change a display design according to the user's operation in the bag 1F.

2. Second Embodiment

Block Diagram of Bag

Figure 12:
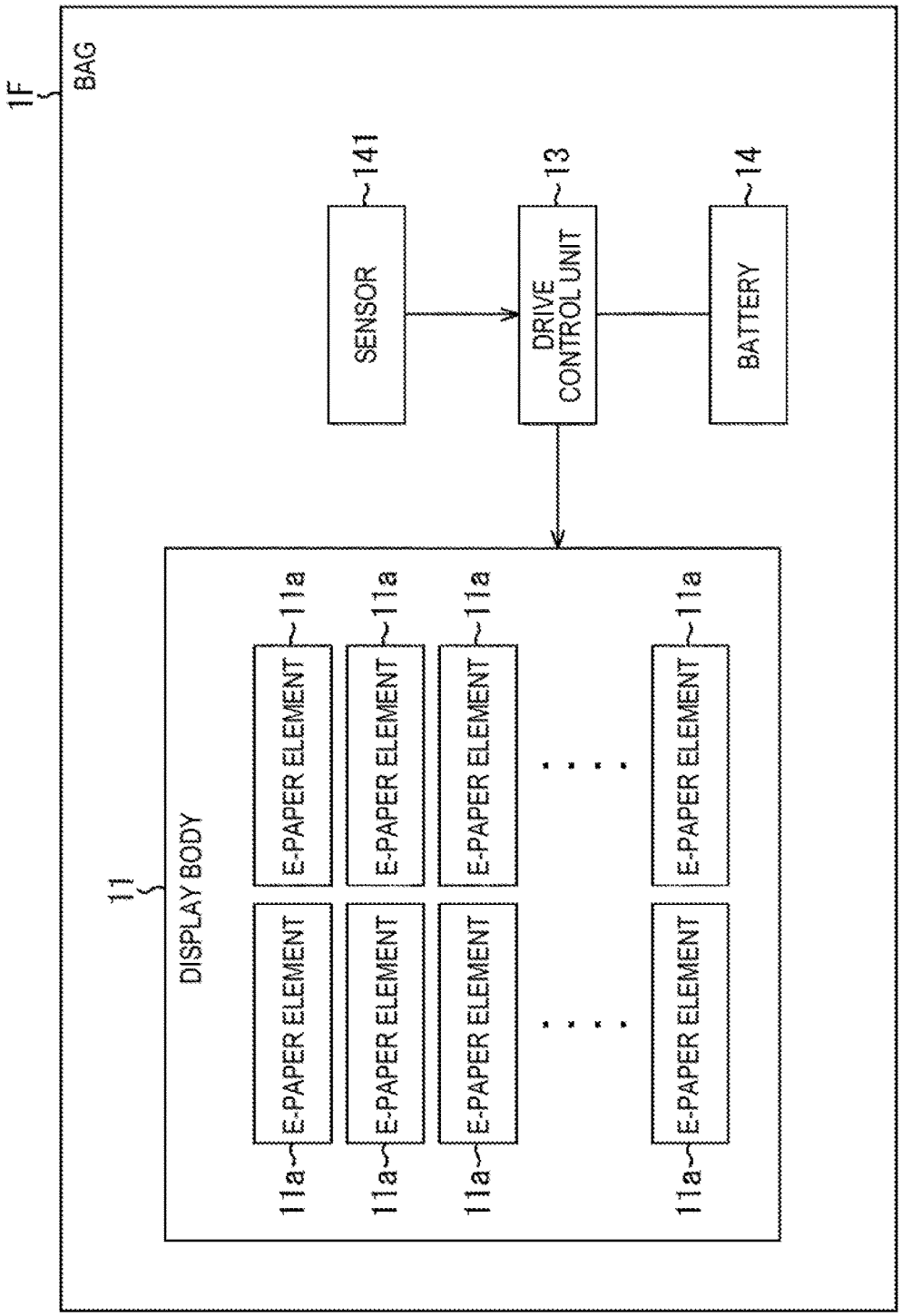
FIG. 12 is a block diagram illustrating a configuration example of a second embodiment of a portable attachment according to the present disclosure.

FIG. 12 is a block diagram illustrating another configuration example of the bag 1F.

Even in FIG. 12, parts corresponding to those of FIGS. 1 and 8 are denoted by the same reference signs. Description of parts overlapping the above description will be appropriately omitted.

The configuration of the bag 1F illustrated in FIG. 12 is different from the configuration of the bag 1F illustrated in FIG. 8 in that a sensor 141 is provided in place of the switch unit 12.

The sensor 141 is a sensor which detects a predetermined state of the bag 1F and supplies the drive control unit 13 with a sensor signal indicating a detection result. The drive control unit 13 controls the drive of each of a plurality of E-paper elements 11a of the display body 11 on the basis of the sensor signal supplied from the sensor 141. That is, the drive control unit 13 changes the display of the plurality of surfaces 121 of the bag 1F on the basis of the state of the bag 1F detected by the sensor 141.

State Change Detection Process

Figure 13:
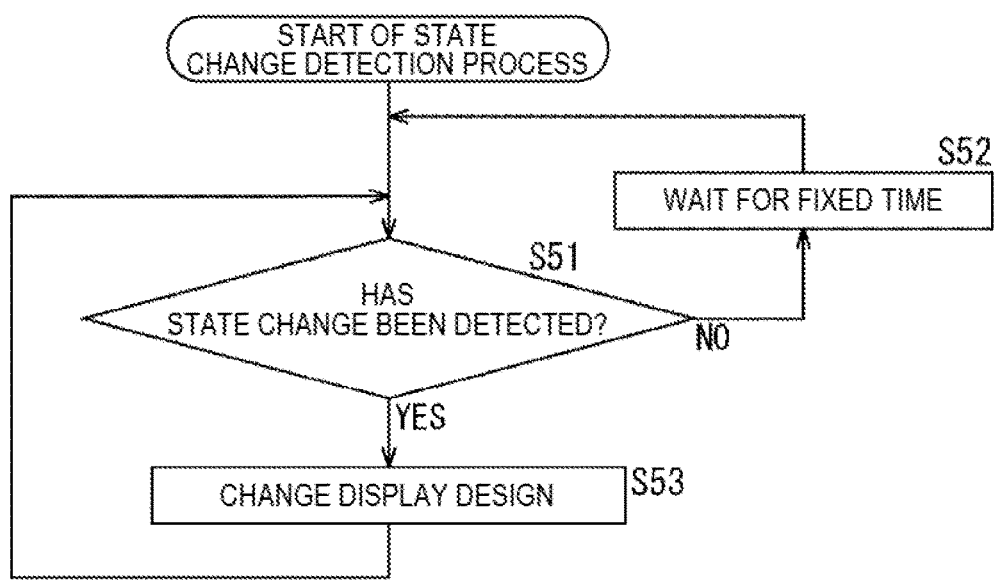
FIG. 13 is a flowchart illustrating a state change detection process.

FIG. 13 is a flowchart of a state change detection process of detecting the change of the state of the bag 1F and changing the display of each surface 121 of the bag 1F.

In the state change detection process, initially, the drive control unit 13 determines whether the state change of the bag 1F has been detected on the basis of the sensor signal supplied from the sensor 141 in step S51.

If it is determined that the state change of the bag 1F has not been detected in step S51, the process proceeds to step S52 and the drive control unit 13 waits for a fixed time. Thereafter, the process returns to step S51. In the processes of steps S51 and S52, the state change of the bag 1F is confirmed at a fixed time interval.

If it is determined that the state change of the bag 1F has been detected in step S51, the process proceeds to step S53 and the drive control unit 13 controls the drive of each of the plurality of E-paper elements 11a corresponding to the plurality of surfaces 121 constituting the bag 1F and changes the display design of the bag 1F.

For example, a connection surface detection sensor which detects whether the shape of the bag 1F is the planar shape or the three-dimensional shape can be provided as the sensor 141 in the bag 1F. When it is detected that the bag 1F has been assembled from the planar shape to the three-dimensional shape as the state change, the drive control unit 13 changes the display so that all the surfaces 121 of the bag 1F change from white to black. On the other hand, when it is detected that the bag 1F has been opened from the three-dimensional shape to the planar shape, the drive control unit 13 changes the display from black to white. Also, the display of white and black may be reversed.

Also, for example, a capacity detection sensor which detects a battery capacity (the remaining voltage) of the battery 14 can be provided as the sensor 141 in the bag 1F. When it is detected that the battery capacity of the battery 14 is less than or equal to a predetermined level as the state change, the drive control unit 13 makes a change to the display indicating that the battery capacity of the battery 14 is less than or equal to a predetermined level such as, for example, changing the display color of only a predetermined surface 121 (e.g., a quadrangular surface 121) among all surfaces 121 constituting the bag 1F to be different from the other surfaces 121. Alternatively, a display design may be changed so that a change speed is changed according to a decrease in the battery capacity such as the case in which a time interval at which the display color of the surface 121 is changed in a predetermined order increases as the battery capacity of the battery 14 decreases.

Also, for example, when the battery 14 is a secondary battery in which self-charging is possible, the drive control unit 13 detects the battery capacity of the battery 14 as the state change and changes the display pattern of the plurality of surfaces 121 constituting the bag 1F or changes display gradation (intermediate gradation) of the predetermined surface 121 according to the detected battery capacity. Here, the display pattern is a pattern configured by combining display colors (white, black, and gray of intermediate gradation) of the plurality of surfaces 121 constituting the bag 1F.

Also, the sensor 141 may not only detect the state change, but also detect a predetermined state.

For example, if the sensor 141 is a weight detection sensor which detects weight of contents of the bag 1F when the bag 1F is in the three-dimensional shape, the drive control unit 13 detects the weight of contents of the bag 1F as the current state of the bag 1F and changes the display pattern of the plurality of surfaces 121 constituting the bag 1F or changes the display gradation (intermediate gradation) of a predetermined surface 121 according to the detected weight.

For example, if the sensor 141 is a brightness detection sensor which detects brightness around the bag 1F, the drive control unit 13 detects current brightness around the bag 1F and changes the display pattern of the plurality of surfaces 121 constituting the bag 1F or changes the display gradation (intermediate gradation) of the predetermined surface 121 according to the detected brightness. Thereby, for example, it is possible to control a change in the display design of the bag 1F at day and night.

For example, if the sensor 141 is a temperature detection sensor which detects temperature around the bag 1F, the drive control unit 13 detects a current temperature around the bag 1F and changes the display pattern of the plurality of surfaces 121 constituting the bag 1F or changes the display gradation (intermediate gradation) of the predetermined surface 121 according to the detected temperature.

For example, if the sensor 141 is a humidity detection sensor which detects humidity around the bag 1F, the drive control unit 13 detects current humidity of the bag 1F and changes the display pattern of the plurality of surfaces 121 constituting the bag 1F or changes the display gradation (intermediate gradation) of the predetermined surface 121 according to the detected humidity.

For example, if the sensor 141 is a smell detection sensor which detects a smell around the bag 1F, the drive control unit 13 detects the current smell around the bag 1F and changes the display pattern of the plurality of surfaces 121 constituting the bag 1F or changes the display gradation (intermediate gradation) of the predetermined surface 121 according to the detected smell.

For example, if the sensor 141 is a touch sensor which detects contact (touch) with the bag 1F, the drive control unit 13 detects the touch with the bag 1F and changes the display pattern of the plurality of surfaces 121 constituting the bag 1F or changes the display gradation (intermediate gradation) of the predetermined surface 121 when the user has touched or performed a stroke operation on it.

For example, if the sensor 141 is a position detection sensor which detects a position of the bag 1F such as the Global Positioning System (GPS), the drive control unit 13 detects a current position of the bag 1F and changes the display pattern of the plurality of surfaces 121 constituting the bag 1F or changes the display gradation (intermediate gradation) of the predetermined surface 121 when the bag 1F is in (near) a predetermine place which is previously registered.

For example, when the sensor 141 is an acceleration sensor which detects a position change of the bag 1F, the drive control unit 13 detects the position change of the bag 1F and changes the display pattern of the plurality of surfaces 121 constituting the bag 1F or changes the display gradation (intermediate gradation) of the predetermined surface 121 when the user has run with the bag 1F or the bag 1F has been thrown and therefore the position change of the bag 1F has been detected.

For example, if the sensor 141 is a counter which counts time, the drive control unit 13 detects the passage of time as the state change and changes the display pattern of the plurality of surfaces 121 constituting the bag 1F or changes the display gradation (intermediate gradation) of the predetermined surface 121 every fixed time. The display pattern of the plurality of surfaces 121 constituting the bag 1F may be changed at day and night.

Also, the drive control unit 13 can perform display of animation or display which gives the impression of a living creature by selecting one or more of the plurality of surfaces 121 constituting the bag 1F randomly or in a predetermined order and changing the display color according to the passage of time.

For example, if the bag 1F has an operation mode of selecting one or more of the plurality of surfaces 121 constituting the bag 1F randomly or in a predetermined order and changing the display color according to the passage of time as a display mode, the bag 1F can be used as a wall-mounted object if the display mode is executed by hanging the bag 1F on the wall in a state in which the bag 1F is in the planar shape like a tapestry. In the display mode, the display color may be changed according to detection results of the above-mentioned various types of sensors 141 such as, for example, the brightness around the bag 1F as well as the passage of time.

Other Configuration Example 1 of Bag

Figure 14:
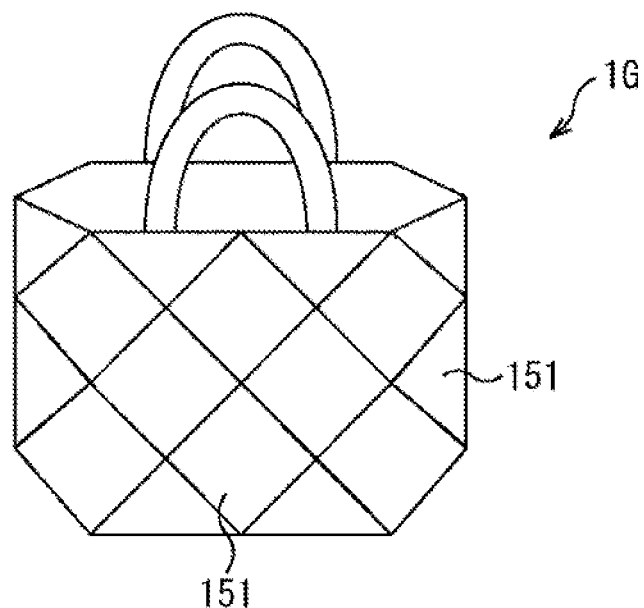
FIG. 14 is a diagram illustrating another configuration example 1 of a bag serving as the portable attachment.

FIG. 14 illustrates another example of the bag serving as the portable attachment 1.

Although the bag 1F illustrated in FIG. 5 or the like has a structure in which the shape of the bag 1F can be changed to the three-dimensional shape and the planar shape, a type of bag serving as the portable attachment 1 is not limited to such an example. For example, a bag (a tote bag) 1G with handles as illustrated in FIG. 14 may be provided.

In the bag 1G, a triangular or quadrangular surface 151 to which the E-paper element 11*a* is attached is connected and molded into a bag shape. Even in the bag 1G, as in the above-mentioned bag 1F, a configuration having an action detection function described with reference to FIG. 9 or a state change detection function described with reference to FIG. 13 can be made.

Also, although the shape of the surface 121 or 151 in which the display color is changed by the E-paper element 11*a* is triangular or quadrangular in the bag 1F and the bag 1G, the shape of each surface constituting the display surface is not limited to the triangular and quadrangular shapes. For example, the shape may be hexagonal, octagonal, or the like.

Other Configuration Example 2 of Bag

Figure 15:
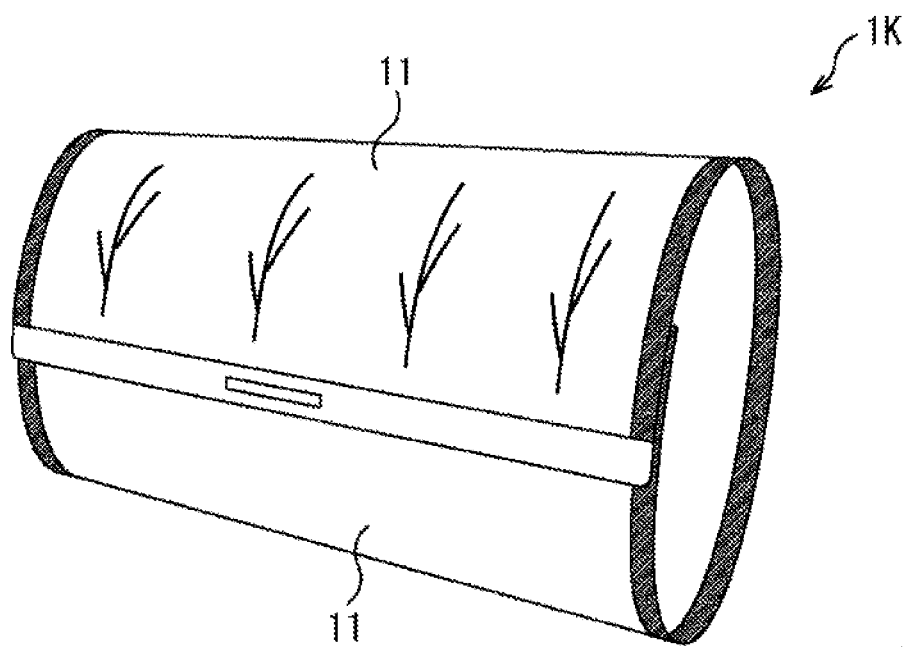
FIG. 15 is a diagram illustrating another configuration example 2 of a bag serving as the portable attachment.

FIG. 15 is another example of the bag and is an example of a bag (a clutch bag) 1K to which no handle is attached.

The display body 11 is attached to a main body surface of the bag 1K and a predetermined image can be displayed.

In FIG. 15, an image of a plurality of trees having a low degree of growth is displayed on the display body 11.

Figure 16:
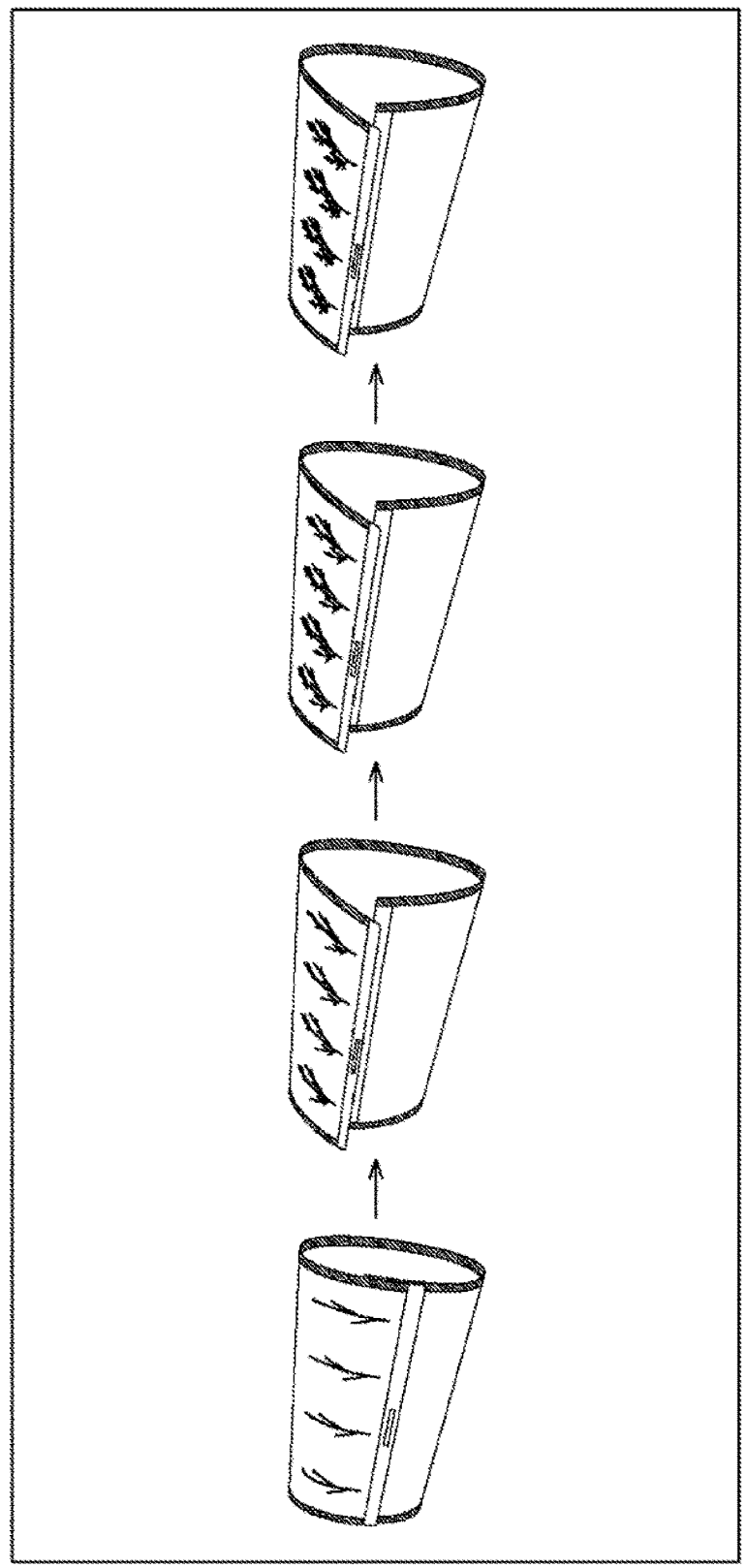
FIG. 16 is a diagram illustrating another configuration example 2 of a bag serving as the portable attachment.

For example, an opened/closed state of the bag 1K is detected as the state change detection process described with reference to FIG. 13 and the bag 1K is changed to an image in which the plurality of trees displayed on the display body 11 in the closed state gradually grow as illustrated in FIG. 16 when the opened state is detected.

Also, for example, the drive control unit 13 can cause the display body 11 to display an image of trees on which leaves are more abundant than those on the trees illustrated in FIG. 15 and cause the image to be changed to an image in which trees flutter in the wind and the leaves of the trees shake and move when it is detected that the bag K is in the opened state.

Thus, it is possible to cause the display body 11 of the bag 1K to perform the transition representation according to the detection result of the state change detection process described with reference to FIG. 13 or the detection result of the action detection process of FIG. 9.

Figure 17:
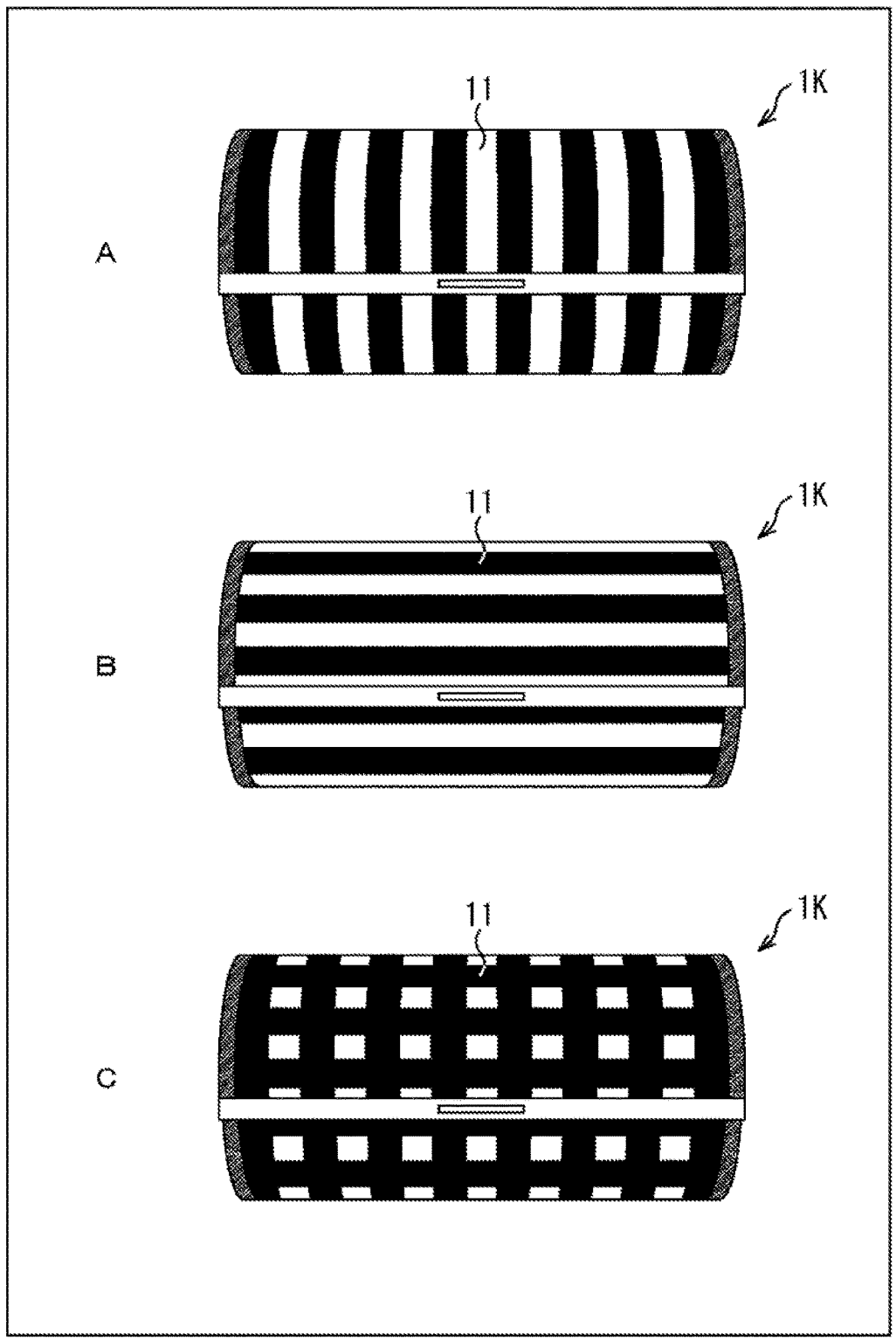
FIG. 17 is a diagram illustrating another configuration example 2 of a bag serving as the portable attachment.

FIG. 17 is another image display example of the bag 1K.

An image of a vertically striped pattern of black and white is displayed on the display body 11 of the bag 1K illustrated in A of FIG. 17.

An image of a horizontally striped pattern of black and white is displayed on the display body 11 of the bag 1K illustrated in B of FIG. 17.

An image of a lattice pattern of black and white is displayed on the display body 11 of the bag 1K illustrated in B of FIG. 17.

Of course, active matrix control for individually driving fine pixels arrayed in a two-dimensional array shape is also possible in in these simple patterns. For example, the simple patterns can be implemented by a configuration in which (2×2) square segments having the same size are arranged and a block of four segments which can be independently driven is repeated and arrayed in a matrix shape as illustrated in FIG. 18.

Figure 19:
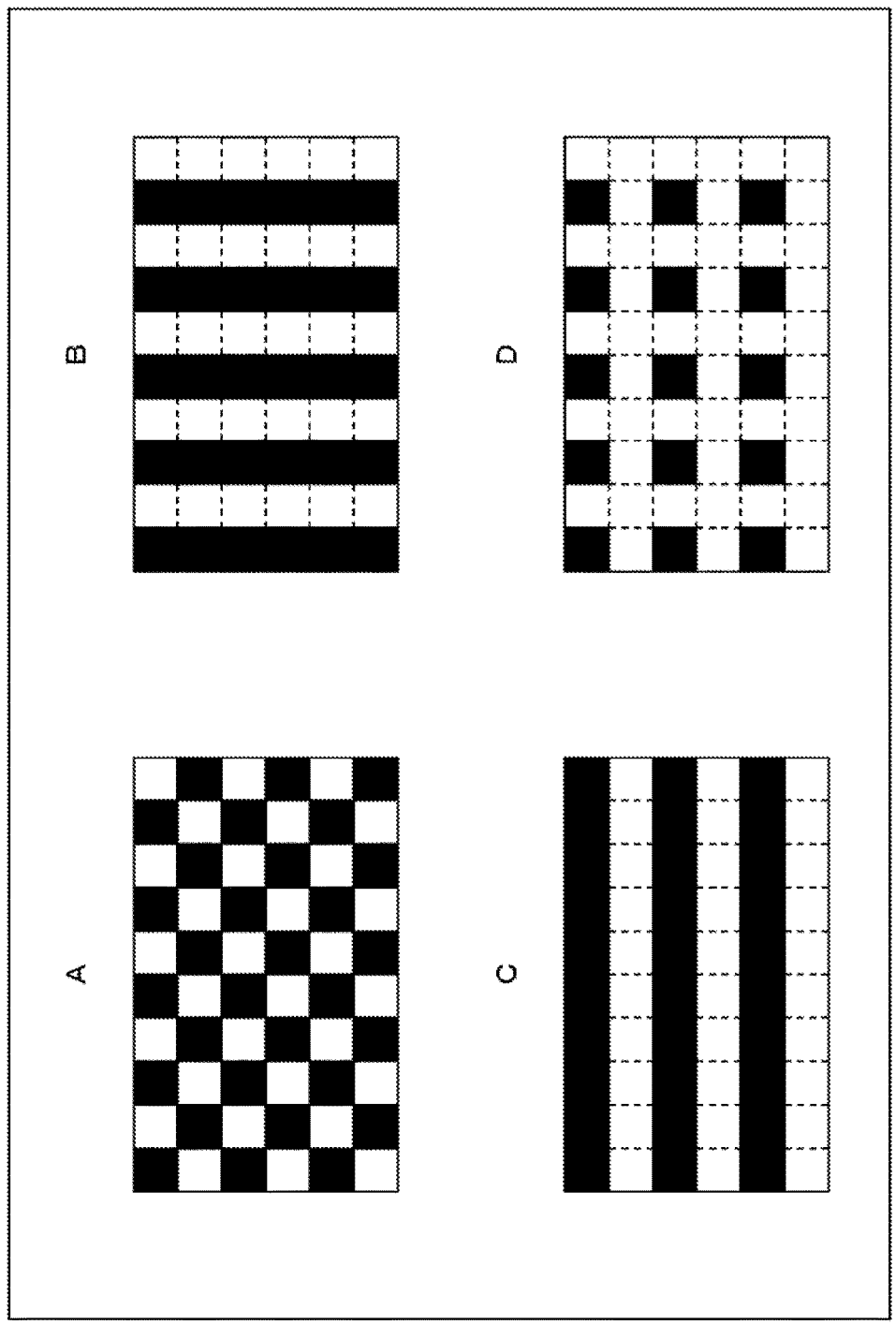
FIG. 19 is a diagram illustrating a configuration example of a display body which enables display of FIG. 17.

When the segments constituting the blocks of four segments are designated as segments 1 to 4 as illustrated in FIG. 18 and, for example, segments 1 and 4 of each block repeated and arrayed in the matrix shape are controlled to be black and segments 2 and 3 are controlled to be white, a checkered pattern illustrated in A of FIG. 19 is formed.

Also, a vertically striped pattern illustrated in B of FIG. 19 is formed when segments 1 and 3 of each block are controlled to be black and segments 2 and 4 are controlled to be white and a horizontally striped pattern illustrated in C of FIG. 19 is formed when segments 1 and 2 of each block are controlled to be black and segments 3 and 4 are controlled to be white. A white grid pattern illustrated in D of FIG. 19 is formed when segments 1 are controlled to be black and segments 2 to 4 are controlled to be white. In contrast, a black lattice pattern illustrated in C of FIG. 17 is formed when segments 1 are controlled to be white and segments 2 to 4 are controlled to be black. Also, although boundaries of the segments are indicated by broken lines for convenience of description in B, C, and D of FIG. 19, such boundaries do not appear in the actual display.

Figure 20:
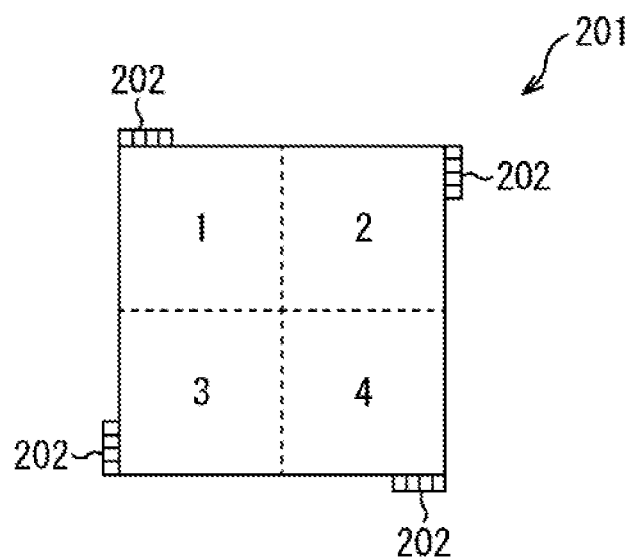
FIG. 20 is a diagram illustrating a configuration example of a display body which enables display of FIG. 17.

Although a matrix array configuration of a plurality of blocks illustrated in FIG. 18 may be constituted of the display body 11 of a one-sheet shape, the matrix array configuration can be configured by connecting a plurality of unit sheets 201 each having four segments illustrated in FIG. 20 in a row direction and a column direction.

At least two connection ports 202 are provided around an outer circumferential part of the unit sheet 201 of FIG. 20. The connection port 202 has a function of connecting adjacent unit sheets 201 and a function as an input/output unit of four control signal lines for driving the four segments 1 to 4. The adjacent unit sheets 201 are connected by the connection port 202, so that the four control signal lines of a plurality of connected unit sheets 201 are connected in series for each segment of segments 1 to 4.

Display control is enabled by inputting a control signal for controlling segments 1 to 4 from the connection port 202 of one unit sheet 201 of one end among the plurality of connected unit sheets 201 and outputting a control signal for controlling segments 1 to 4 from the connection port 202 of one unit sheet 201 of the other end.

Although a total of four connection ports 202 are provided on upper, lower, left, and right sides one by one in the unit sheet 201 of FIG. 20, it is only necessary for the number of connection ports 202 to be at least two for an input side and an output side. Also, the connection port 202 is configured to be removable and an unnecessary connection port 202 may be removed according to a connection direction.

Although a configuration in which the unit sheets 201 are connected only in a planar direction has been described in the above-mentioned example, it is also possible to make a configuration in which a connection port 202 (not illustrated) is also provided in a center portion of the unit sheet 201 and some of the unit sheets 201 can be connected in an overlapping state, for example, as illustrated in FIG. 21.

Although the examples of FIGS. 18 to 21 have been described as examples in which the shape of the unit sheet 201 and the shape of each segment included in the unit sheet 201 are quadrilaterals (squares), these shapes are not limited to quadrilaterals, but may be other shapes or a combination of a plurality of shapes. Also, the number of segments included in the unit sheet 201 is not limited to the abovementioned four, but may be two, three, or five or more.

Other Configuration Example 3 of Bag

Figure 22:
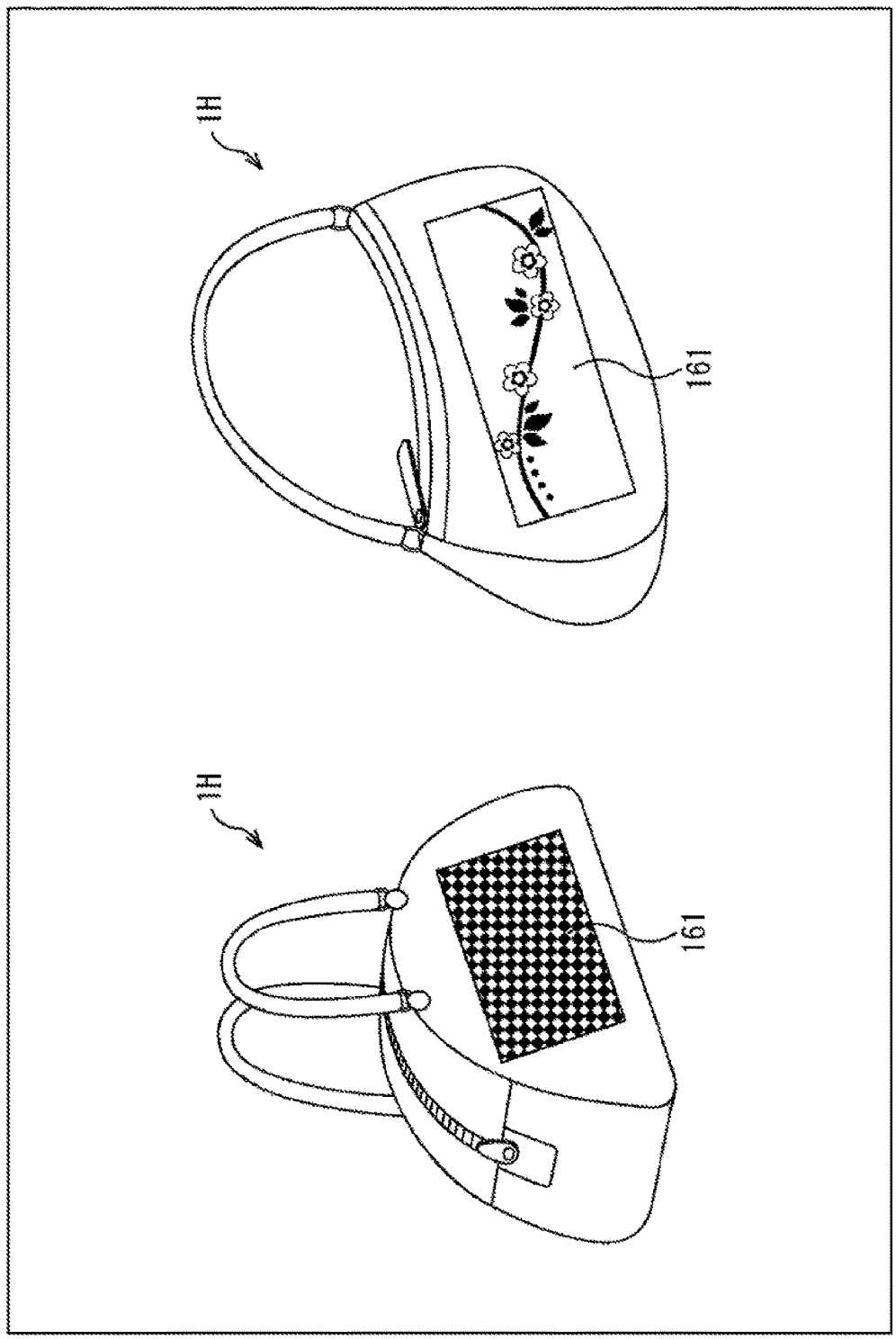
FIG. 22 is a diagram illustrating still another configuration example 3 of a bag serving as the portable attachment.

FIG. 22 illustrates still another configuration example of a bag serving as the portable attachment 1.

A bag 1H illustrated in FIG. 22 has the shape of a Boston bag or a handbag and has a display unit 161 in which an image is changeable on a side surface.

The display unit 161 includes an electrophoretic display (the display body 11) of active matrix control in which the entire display area is divided into a plurality of pixels in a two-dimensional array shape and the divided pixels are turned on/off as units of control. Thereby, as illustrated in FIG. 22, a predetermined display design such as a lattice pattern or a floral pattern can be displayed on the display unit 161.

Figure 23:
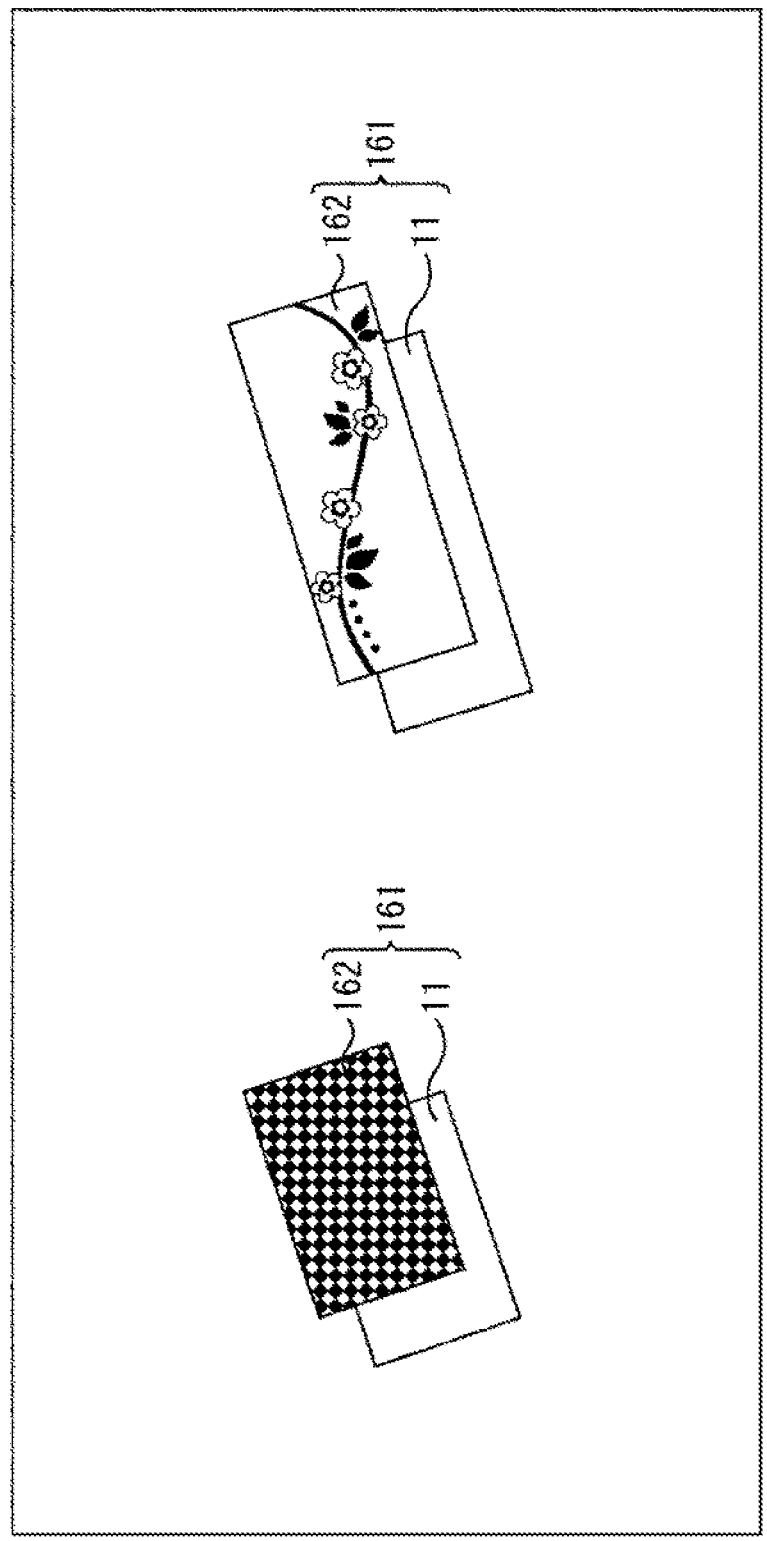
FIG. 23 is a diagram illustrating a display unit of the bag of FIG. 22.

Alternatively, as illustrated in FIG. 23, the display unit 161 may be configured by attaching a film 162 on which a predetermined pattern or character such as a logo, a mark, a symbol, painting, a drawing, or graphic is drawn to an upper surface of the display body 11 using the entire display area as one display control unit (segment). In this case, the display body 11 performs only display of white, black, or intermediate gradation according to an applied voltage and an image of the display unit 161 is changed according to a change in the display color of the display body 11. Also, the film 162 may be a colored color film.

Application Example for Bow Tie

Figure 24:
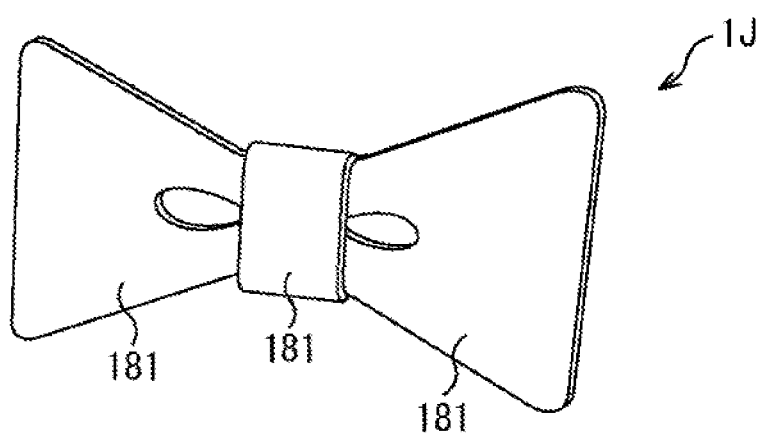
FIG. 24 is a diagram illustrating an example of a bow tie serving as the portable attachment.

FIG. 24 illustrates an example of a bow tie 1J serving as the portable attachment 1.

In the bow tie 1J illustrated in FIG. 24, a front portion viewed by an opposite side serves as a display unit 181 when the user is wearing the bow tie 1J.

Similar to the display unit 161 of the bag 1H illustrated in FIG. 22, the display unit 181 can have a structure in which the electrophoretic display of active matrix control or the electrophoretic display of one segment illustrated in FIG. 23 and the film of the pattern are laminated.

Even in the bow tie 1J, as in the above-mentioned bag 1F, it is possible to make a configuration having the action detection function described with reference to FIG. 9 or the state change detection function described with reference to FIG. 13.

Also, the display unit 181 of the bow tie 1J may be molded with an uneven pattern or the display body 11 may be woven as will be described below with reference to B of FIG. 30 to represent a three-dimensional texture. Also, an application example of the portable attachment 1 is not limited to the bow tie 1J and, of course, may be a necktie.

3. Third Embodiment

Configuration Example of Portable Attachment

Figure 25:
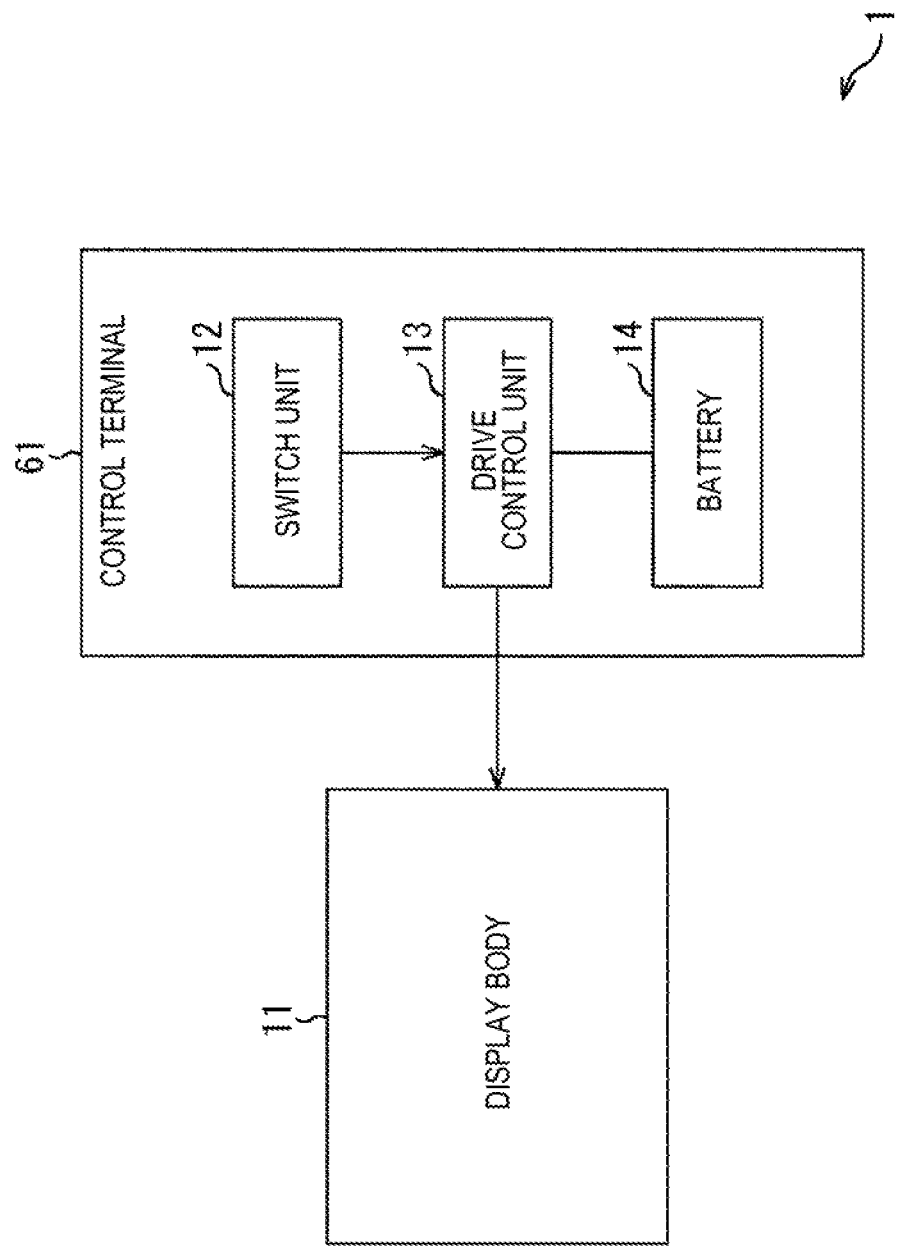
FIG. 25 is a block diagram illustrating a configuration example of a third embodiment of the portable attachment according to the present disclosure.

FIG. 25 is a block diagram illustrating a configuration example of the third embodiment of the portable attachment according to the present disclosure.

As illustrated in FIG. 25, the portable attachment 1 can separately separate the display body 11 and a control terminal 61 of a side for controlling the drive of the display body 11 and provide the user with the display body 11 and the control terminal 61. More specifically, as illustrated on the left side in FIG. 26, the sheet-shaped display body 11 and the control terminal 61 separate therefrom are provided.

Because the display body 1 using the electrophoretic display has a soft and flexible material as mentioned above, the user can freely cut the display body into a desired shape with scissors.

Figure 26:
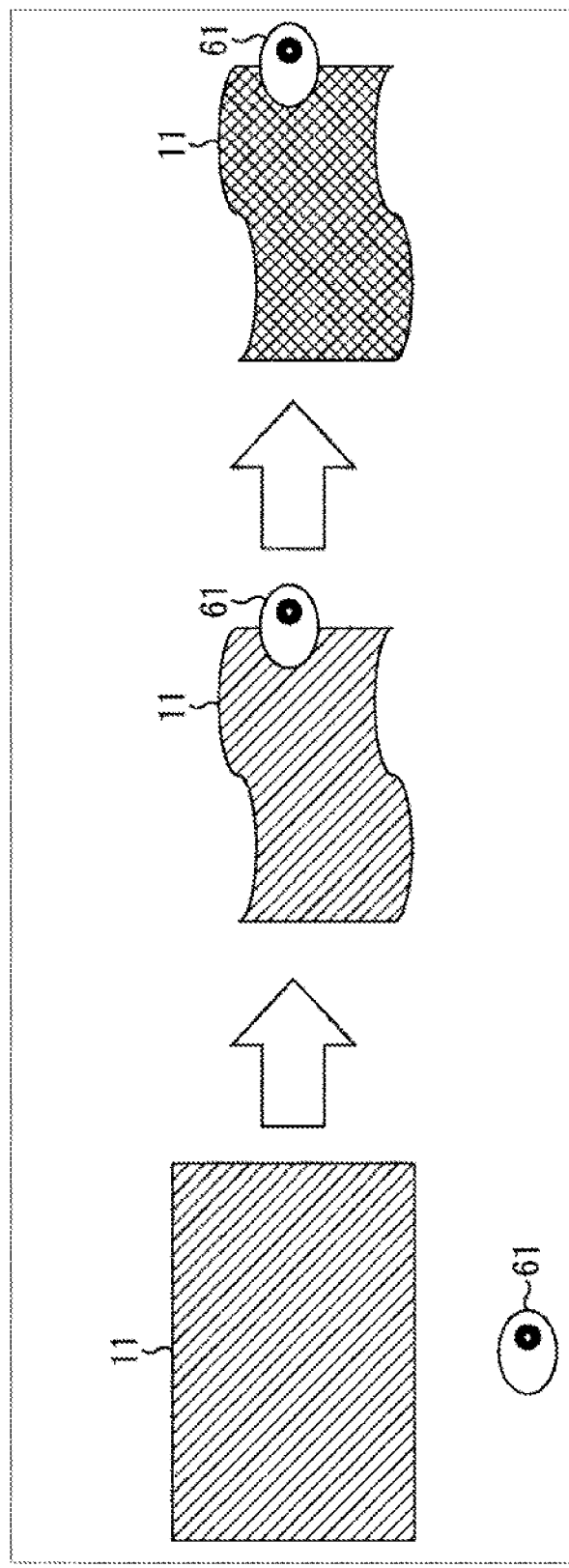
FIG. 26 is a diagram illustrating a use example of the portable attachment according to the third embodiment.

As illustrated in the center of FIG. 26, the user can cut the sheet-shaped display body 11 with the scissors or the like and mold the display body 11 into a desired shape. By mounting the control terminal 61 at a predetermined position, the display of the display body 11 can be controlled by the control terminal 61 and the color can be changed as illustrated on the right in FIG. 26.

Figure 27:
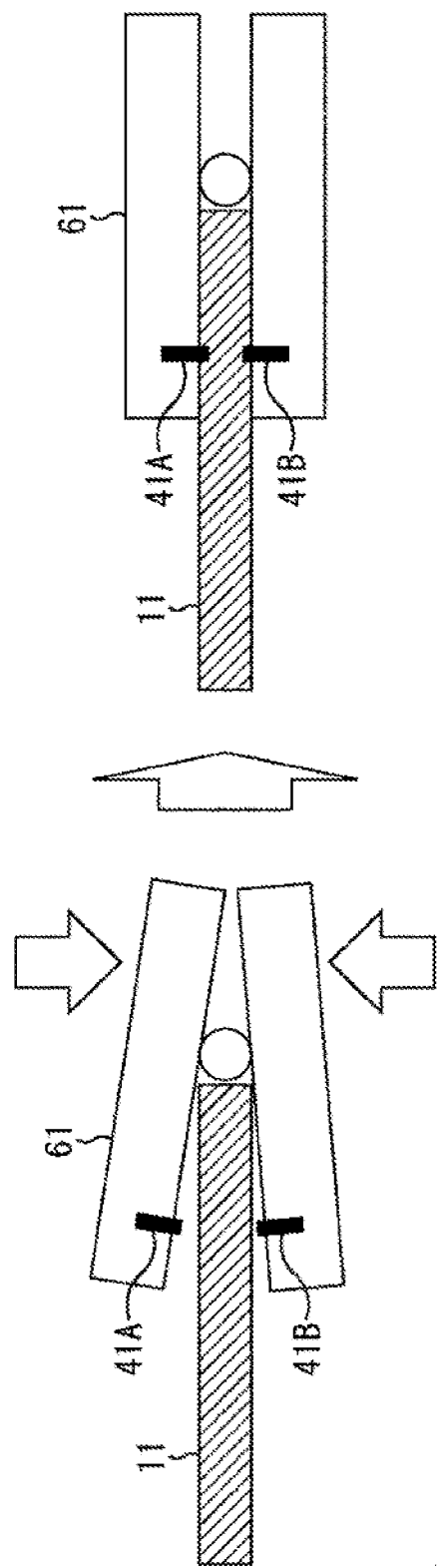
FIG. 27 is a diagram illustrating a use example of the portable attachment according to the third embodiment.

The control terminal 61 can have a clip shape as illustrated in FIG. 27. When the display body 11 is sandwiched by the clip-shaped control terminal 61, one connection port 41A is connected to the transparent electrode layer 32 and the other connection port 41B is connected to the electrode layer 36 as illustrated in FIG. 2, so that anyone can easily mount the control terminal 61 on the display body 11.

If an area of the display body 11 capable of being sandwiched by the clip-shaped control terminal 61 is limited to a predetermined area such as a peripheral portion of the display body 11, an insulation sheet or the like may be pre-inserted between the transparent electrode layer 32 and the electrode layer 36 of the display body 11

Also, even if the sheet-shaped display body 11 is cut by scissors or the like, a solution of the micro-encapsulation layer 31 does not immediately flow out, but an outer circumferential part of the display body 11 can be sealed after the cutting using an adhesive or the like if necessary.

Application Example for Clothing

Figure 28:
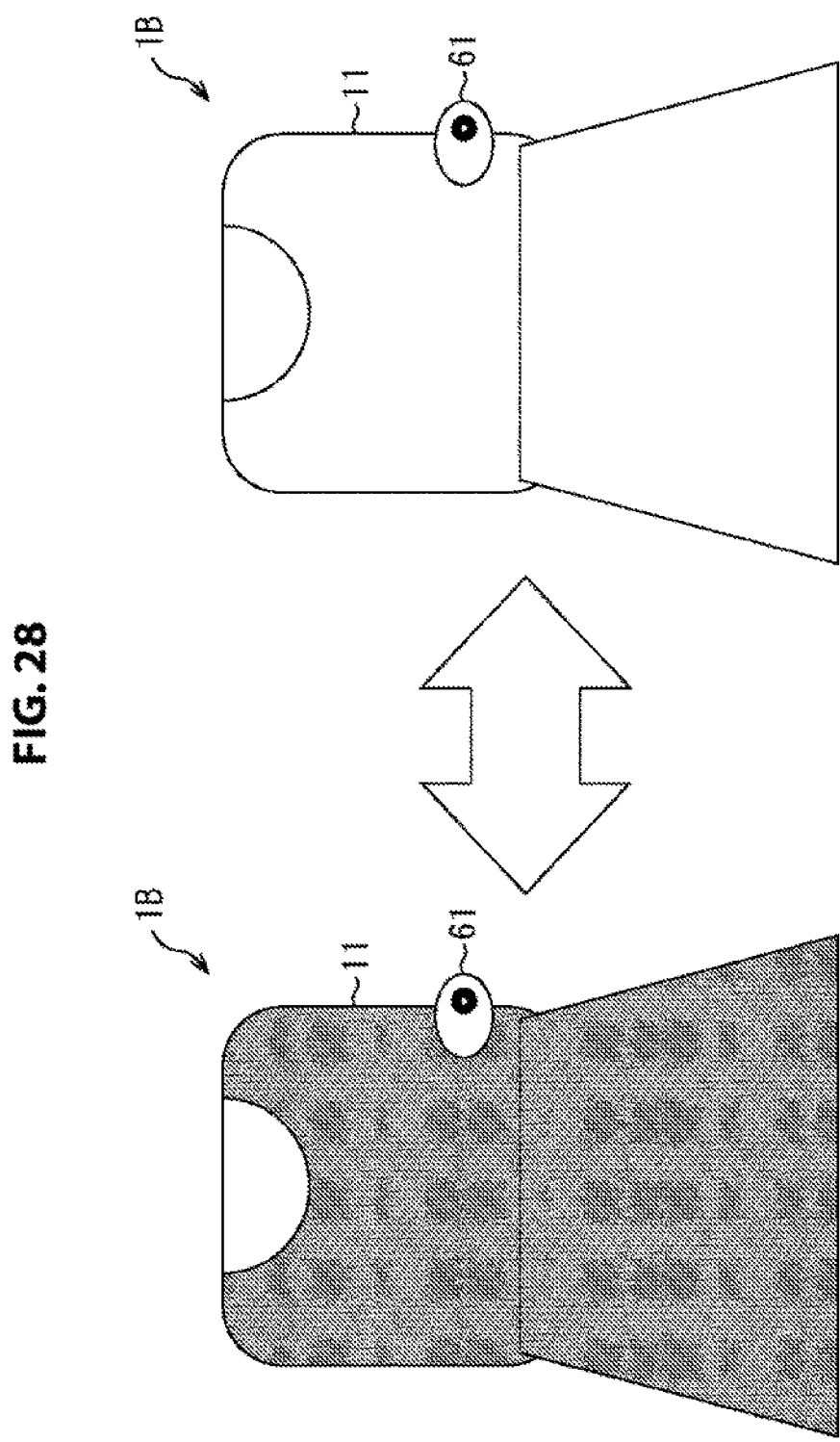
FIG. 28 is a diagram illustrating a display example when the portable attachment is clothing.

FIG. 28 illustrates an example of clothing 1B serving as the portable attachment 1 created by cutting the display body 11 into a desired shape and attaching the control terminal 61 to the cut display body 11.

It is possible to manufacture clothing 1B having high fashionability because the display body 11 has excellent flexibility and can be cut into a free shape or the control terminal 61 which controls the drive of the display body 11 can be set at a free position by forming the control terminal 61 in the clip shape.

The user performs an ON/OFF operation in the control terminal 61, thereby selecting the color of the display body 11 corresponding to the fabric of the clothing 1B from, for example, one of black and red.

Also, although the clothing 1B of FIG. 28 is an example in which the entire surface of the display body 11 corresponding to fabric of the clothing 1B is a display area, the electrode layer 36 of a base material side illustrated in FIG. 2 may be patterned in a predetermined pattern. In this case, a positive or negative voltage is applied to only a portion of the pattern, display or non-display is performed, and a predetermined pattern can be displayed like a floating pattern. In the patterning of the pattern, it is possible to use a conductive ink pen by which a pattern drawn in the conductive ink becomes a conductive pattern, a circuit pattern creation printer by which a portion printed in the conductive ink becomes a conductive portion, etc.

Shape Example of Display Body

Figure 29:
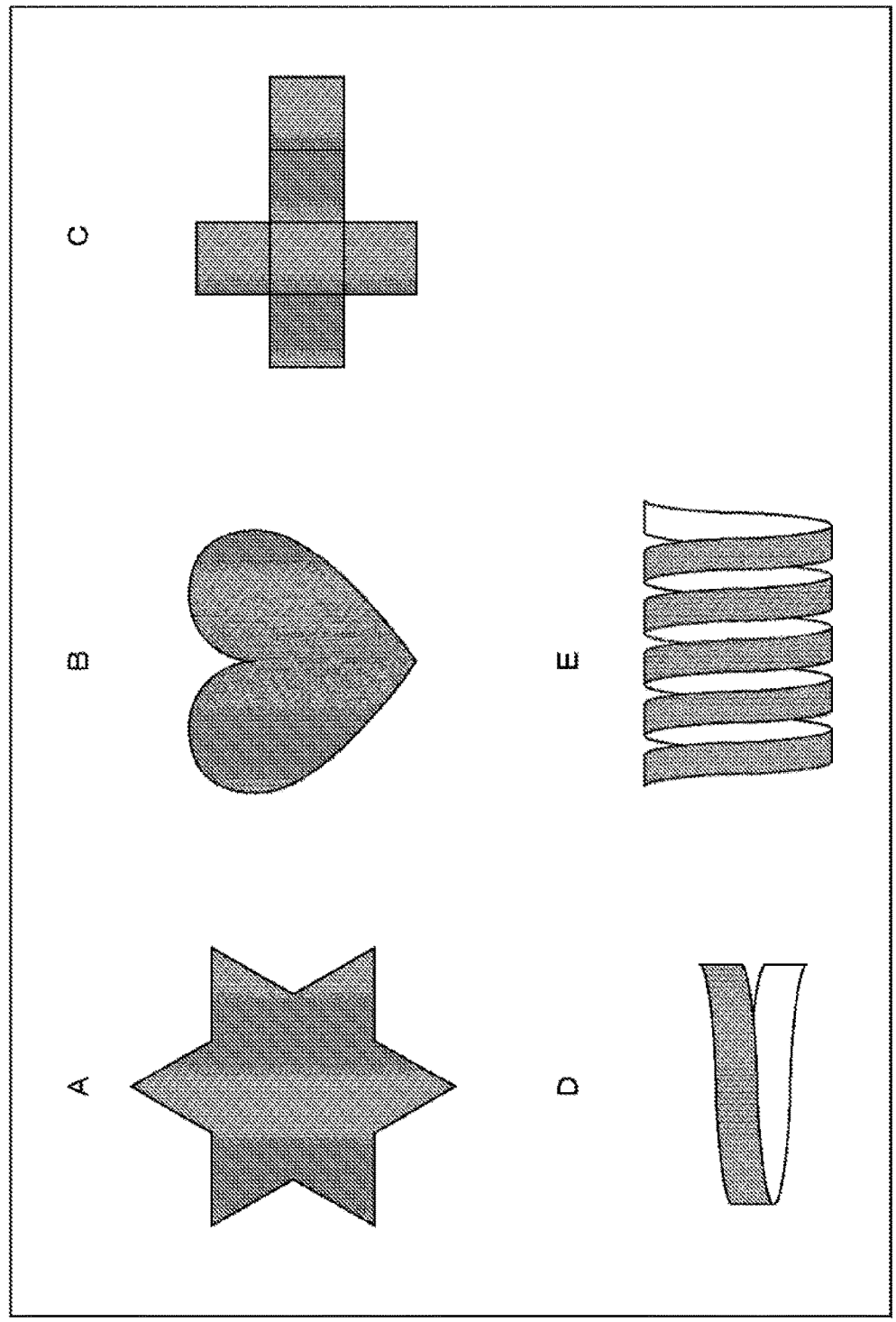
FIG. 29 is a diagram illustrating a shape example of the display body.

Also, the display body 11 can have a sheet shape previously formed in a predetermined shape as illustrated in A of FIG. 29 to E of FIG. 29 instead of the rectangular sheet shape illustrated in FIG. 26.

A of FIG. 29 illustrates an example of the display body 11 molded in a star shape.

B of FIG. 29 illustrates an example of the display body 11 molded in a heart shape.

C of FIG. 29 illustrates an example of the display body 11 molded in a shape of a square opened view in which a three-dimensional shape is formed by assembly.

D of FIG. 29 illustrates an example of the display body 11 molded in a strip or string shape.

E of FIG. 29 illustrates an example of the display body 11 molded in a three-dimensional shape of spiral winding.

Although the conventional displays generally have a planar shape with an aspect ratio of 16:9 or 4:3, any display body 11 using the electrophoretic display can be provided in various shapes such as a star shape, a heart shape, and a clover shape as illustrated in A of FIG. 29 and B of FIG. 29.

Also, the display body 11 can also be provided in a strip shape or a string shape as illustrated in D of FIG. 29 and E of FIG. 29. In this case, as illustrated in A of FIG. 30, it is possible to weave the display body 11 with a part of a hat 1C woven through knitting and create a hair extension (not illustrated) into which the display body 11 is woven. A of FIG. 30 illustrates an example of the hat 1C serving as the portable attachment 1.

Figure 30:
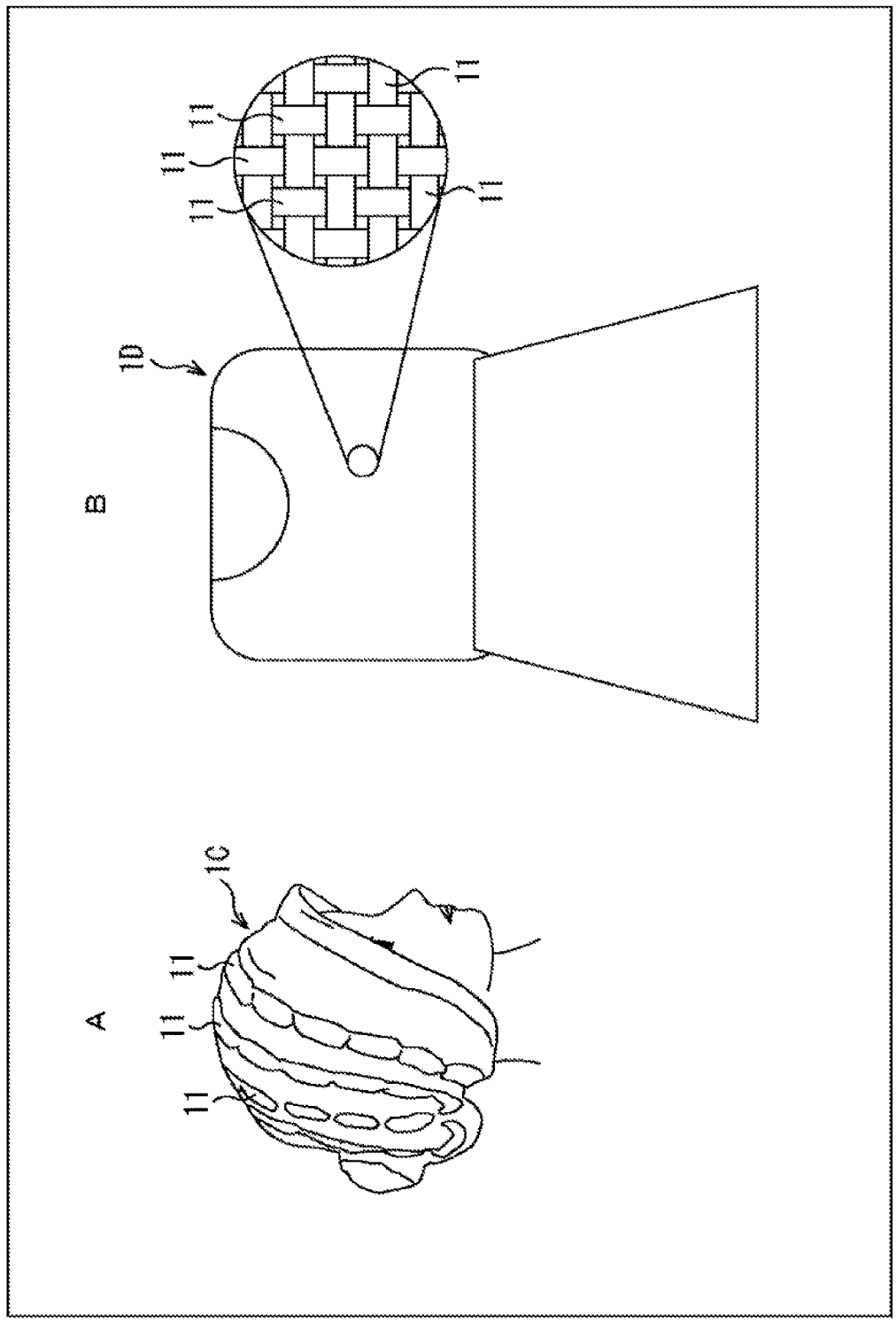
FIG. 30 is a diagram illustrating an example of the portable attachment configured by weaving the display body.

Also, if the strip- or string-shaped display body 11 is used, clothing 1D serving as the portable attachment 1 can be created by weaving the display body 11 as illustrated in B of FIG. 30. It is also possible to manufacture the bag (the tote bag) 1G as illustrated in FIG. 14 by weaving the strip- or string-shaped display body 11.

Thus, by weaving the strip- or string-shaped display body 11, it is possible to represent new three-dimensional texture as the display and assign a new fabric shape to the portable attachment 1 which is an article attached to a body of the user or carried by the user.

When each of a plurality of woven display bodies 11 includes single segments in which the same color is displayed in clothing 1D serving as the portable attachment 1 illustrated in B of FIG. 30, it is possible to select and display one of two colors corresponding to the ON state and the OFF state as illustrated in FIG. 28.

Also, for example, by sequentially attaching color filters (color films) 35 of red (R), green (G), and blue (B) to the outermost surfaces of a plurality of string-shaped display bodies 11 arrayed in the vertical direction and the horizontal direction, each of the plurality of string-shaped display bodies 11 is a single segment which emits a single color, but complex color representation is enabled by the entire woven clothing 1B. Also, it is possible to switch the display of red, green, or blue if only the display bodies 11 having the color filters 35 of the same color are selectively displayed.

Of course, when each of the plurality of string-shaped display bodies 11 is configured by two-dimensionally arraying fine segments to which the R, G, or B color filter (color film) 35 is attached, a complex design (image) can be represented without a limit to the string shape of the display body 11 by individually controlling individual segments.

Thus, display bodies 11 of various shapes that can be used as a do it yourself (DIY) tool are provided so that the user can freely manufacture a product. The display bodies 11 of various shapes can be configured to be removable from any product by attaching an adhesive tape or a hook-and-loop fastener to the backside.

4. Fourth Embodiment

Configuration Example of Portable Attachment

Figure 31:
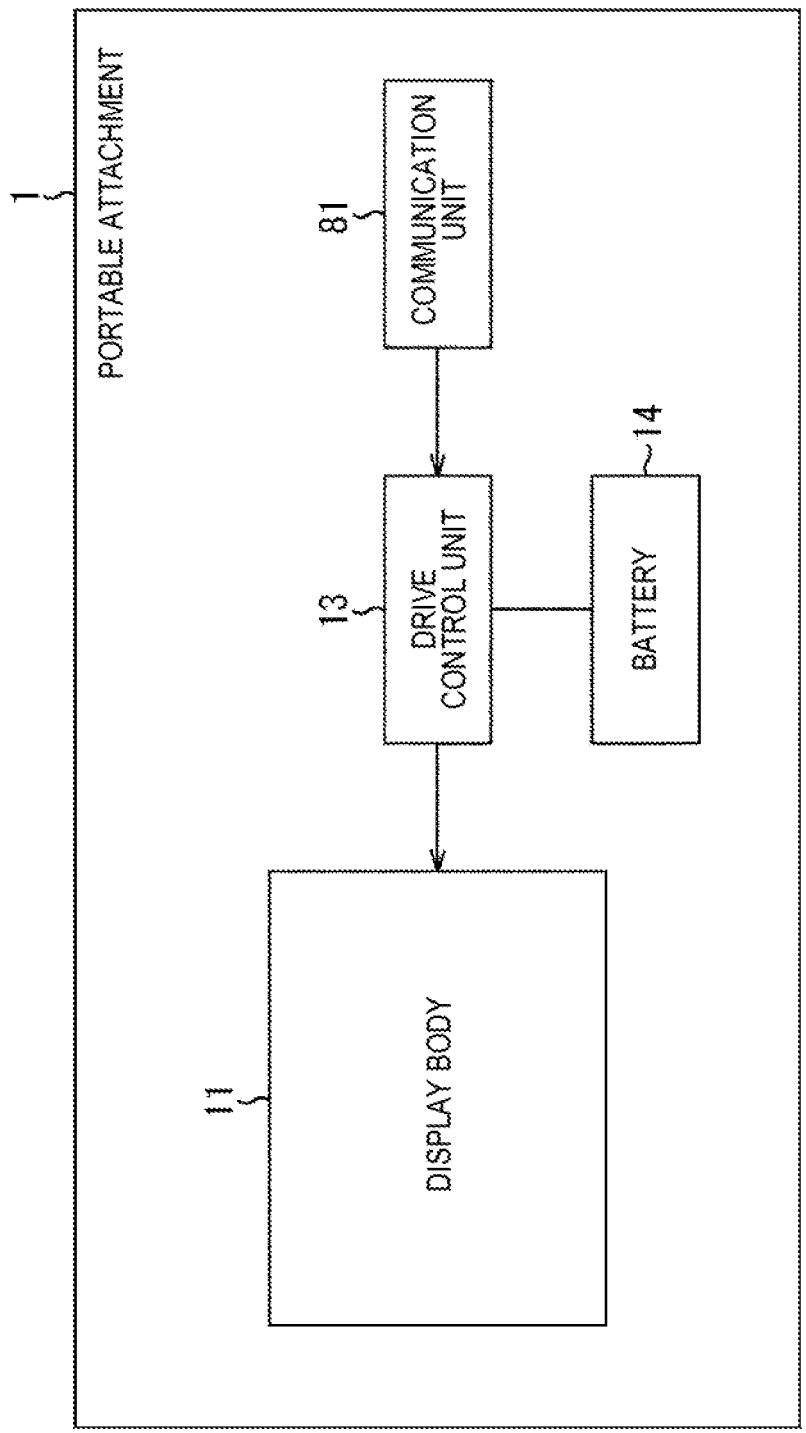
FIG. 31 is a block diagram illustrating a configuration example of a fourth embodiment of the portable attachment according to the present disclosure.

FIG. 31 is a block diagram illustrating a configuration example of the fourth embodiment of the portable attachment according to the present disclosure.

In FIG. 31, parts corresponding to those of the above-mentioned first embodiment are denoted by the same reference signs. Description thereof will be appropriately omitted.

As compared with the configuration according to the first embodiment, the configuration of the portable attachment 1 according to the fourth embodiment is newly provided with a communication unit 81 in place of the omitted switch unit 12.

The communication unit 81 performs for example, near field communication (NFC) communication, infrared communication, and wireless communication based on Bluetooth (registered trademark) or the like, with another communication apparatus such as a smartphone. Also, the communication unit 81 may be a communication device connected to a network such as the Internet, a local area network (LAN), or a wide area network (WAN). In this case, the communication unit 81 communicates with another communication apparatus such as a server apparatus via the network. That is, in the fourth embodiment, a scheme of wireless communication to be performed by the communication unit 81 is not limited and any scheme can be adopted.

The communication unit 81 receives design data which is control information for controlling one or more segments constituting a display area of the display body 11 from the other communication apparatus. Here, the design data is ON/OFF information for one or more segments of the display body 11 or gradation information indicating intermediate gradation.

Although the display area of the display body 11 may be a single segment in the fourth embodiment, more various designs can be represented in a plurality of segments such as stripe and dot patterns or a plurality of segments in which fine segments are arrayed in a two-dimensional array shape. Although the number of colors capable of being displayed by the display body 11 may be one, more various design representations are possible in the case of a plurality of colors or full color display by R, G, and B.

The communication unit 81 supplies the design data corresponding to a design (image) displayed on the display body 11 to the drive control unit 13.

The drive control unit 13 controls one or more segments of the display body 11 on the basis of the acquired design data.

Also, it is possible to extract power from radio waves received from another communication apparatus serving as a reader/writer and perform an operation (drive) according to the extracted power in the NFC communication. Therefore, if the communication unit 81 performs wireless communication using the NFC communication, the battery 14 can be omitted.

Use Example 1

Figure 32:
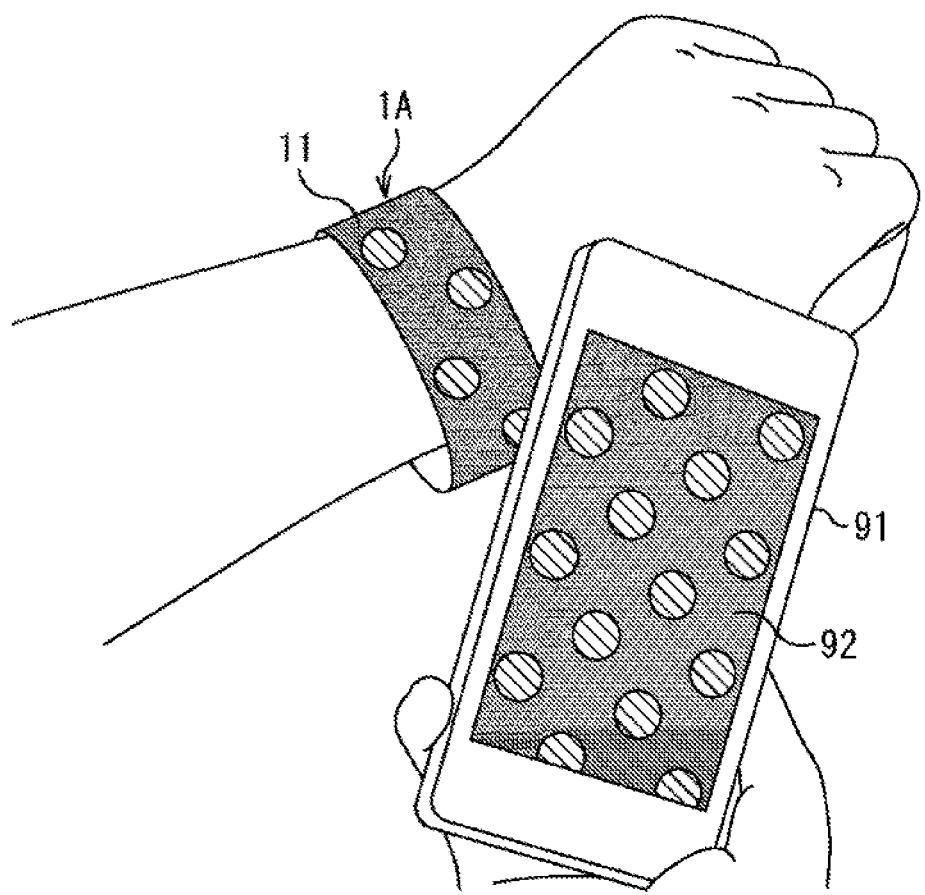
FIG. 32 is a diagram illustrating a use example of the portable attachment according to the fourth embodiment.

FIG. 32 is a diagram illustrating a use example of a bangle 1A serving as the portable attachment 1 according to the fourth embodiment.

Design data is stored in the smartphone 91 and the user first causes the display 92 of the smartphone 91 to display a design desired to be transmitted to the bangle 1A.

When the bangle 1A and the smartphone 91 are assumed to perform wireless communication using NFC communication, the user performs an operation of placing the smartphone 91 in proximity to the bangle 1A (including a touch operation). When the smartphone 91 is in proximity within several cm from the bangle 1A, the communication unit 81 and the drive control unit 13 of the bangle 1A are activated by receiving radio waves from the smartphone 91 which is the reader/writer.

The communication unit 81 of the bangle 1A receives data (design data) of a design displayed on the display 92 from the smartphone 91 and supplies the drive control unit 13 with the design data. The drive control unit 13 drives each segment of the display body 11 on the basis of the supplied design data.

Thereby, the image of the display body 11 of the bangle 1A is changed to a design displayed on the display 92 of the smartphone 91.

Also, although the image of the display body 11 may be instantaneously switched to the design displayed on the display 92 of the smartphone 91, the drive control unit 13 may perform drive control, for example, in which the image of the display body 11 is sequentially changed from one end of the display area of the display body 11 to cause the user to feel an operation indicating that the design has been transmitted. By performing such drive control, it is possible to transfer a state in which an image is intuitively transmitted and cause the user to experience the pleasure and fun of transmission.

At this time, it is possible to transfer a more intuitive operation to the user by performing drive control even on the side of the display 92 of the smartphone 91 and assigning, for example, graphic display for absorbing a pattern and a sound effect.

Also, when the display area of the display body 11 of the bangle 1A is widened to a certain extent, drive control for changing the image of the display body 11 may be performed so that the ripple is widened in order from a place to which the user brings the smartphone 91 in proximity. However, in this case, it is necessary to detect a place of proximity in the entire display area of the display body 11. Examples of a method of specifying the proximity place are a method of dividing the display area of the display body 11 into a plurality of areas and arranging a sensor in each area, a method of estimating a proximity position from a received level of radio waves or the like, etc.

Figure 33:
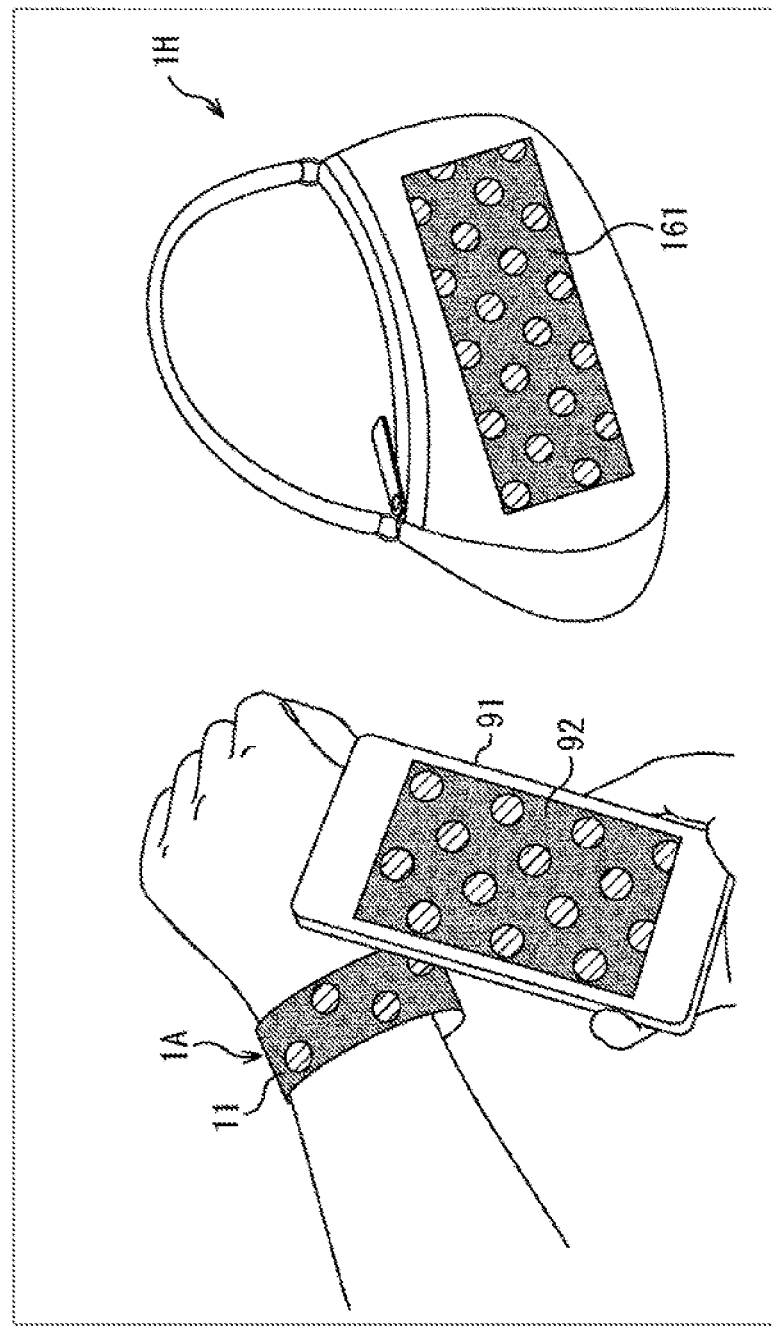
FIG. 33 is a diagram illustrating a use example of the portable attachment according to the fourth embodiment.

Also, the user can apply the same design to a plurality of different types of portable attachments 1 and enjoy a matching design. For example, as illustrated in FIG. 33, the image of the display body 11 of the bangle 1A and the image of the display unit 161 of the bag 1H can also be set to the same design. In this case, the configuration of the bag 1H is configured to have the communication function described with reference to FIG. 31.

Use Example 2

If the portable attachment 1 has a communication function, the user can change the display (image) of the display body 11 of the portable attachment 1 to a desired design as described with reference to FIGS. 32 and 33.

Therefore, a system in which a user of the portable attachment 1 purchases a desired design to be displayed on his/her portable attachment 1 or a creator creates and provides a design capable of being displayed on the portable attachment 1 can be constructed.

Figure 34:
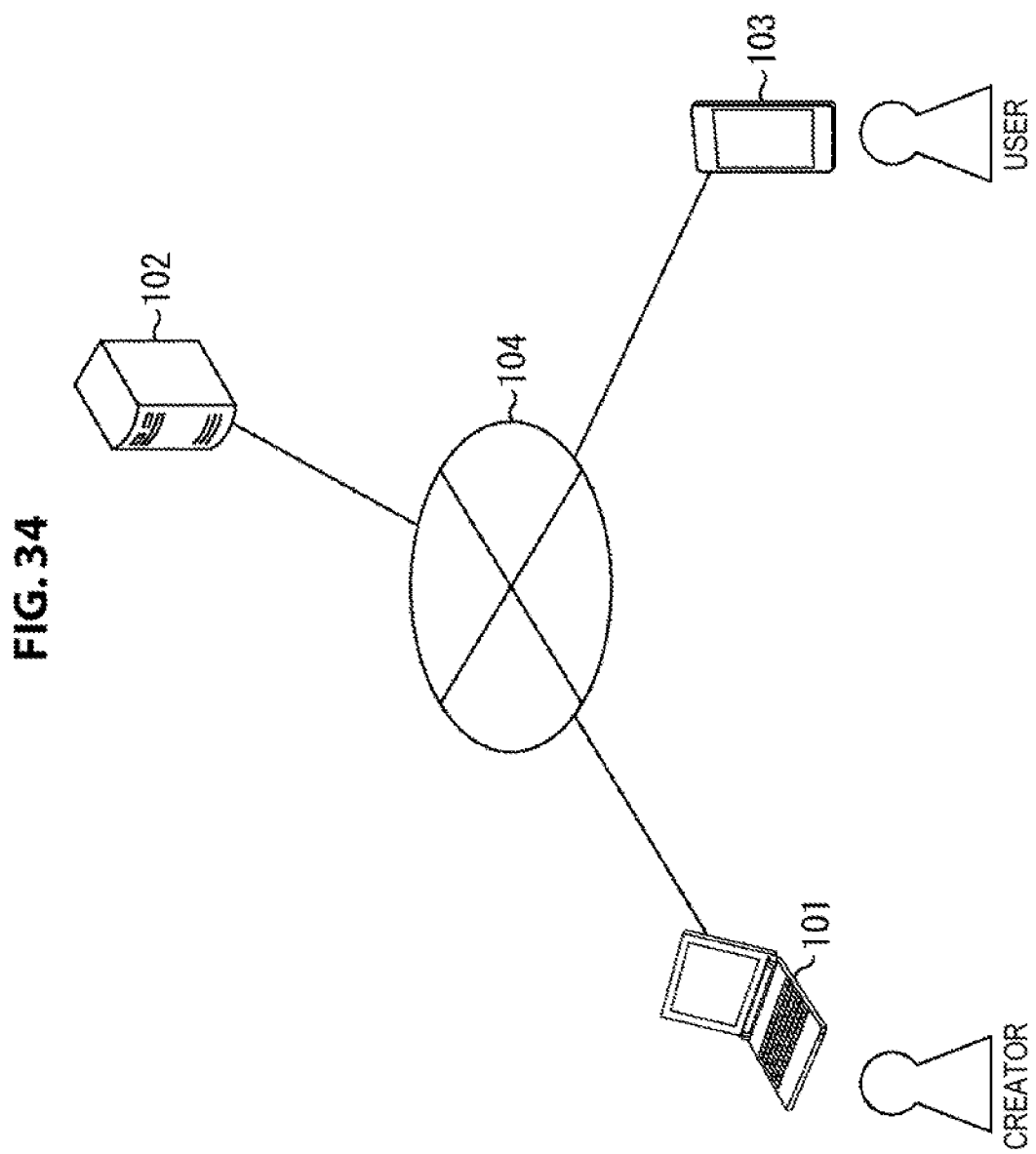
FIG. 34 is a diagram illustrating a configuration example of a design providing system.

FIG. 34 illustrates a configuration example of a design providing system which implements a design providing service in which a design can be delivered between the creator and the user.

The design providing system is configured to include at least a terminal apparatus 101 to be operated by the creator, a server 102 in which design data of a design provided to the user by the creator is stored, and a terminal apparatus 103 in which the user downloads the design data. In the design providing system, a large number of creators and users can actually access the server 102 using their terminal apparatuses. However, one creator and one user will be described for simplification of description.

Each of the terminal apparatuses 101 and 103 is constituted of, for example, a personal computer (PC), a notebook PC, a tablet, a smartphone, or the like, and has at least a network communication function. Hereinafter, the terminal apparatus 101 of the creator is referred to as a creator terminal 101 and the terminal apparatus 103 of the user is referred to as a user terminal 103.

The creator terminal 101, the server 102, and the user terminal 103 are connected via the network 104 such as the Internet, a local area network (LAN), or a wide area network (WAN).

The server 102 stores design data uploaded by the creator and provides the user with design data provided by a large number of creators on the Web when the user accesses a predetermined address (uniform resource locator (URL)) of the server 102. In other words, an online shop which provides design data of the portable attachment 1 is implemented by the server 102.

Design Providing Process

Figure 35:
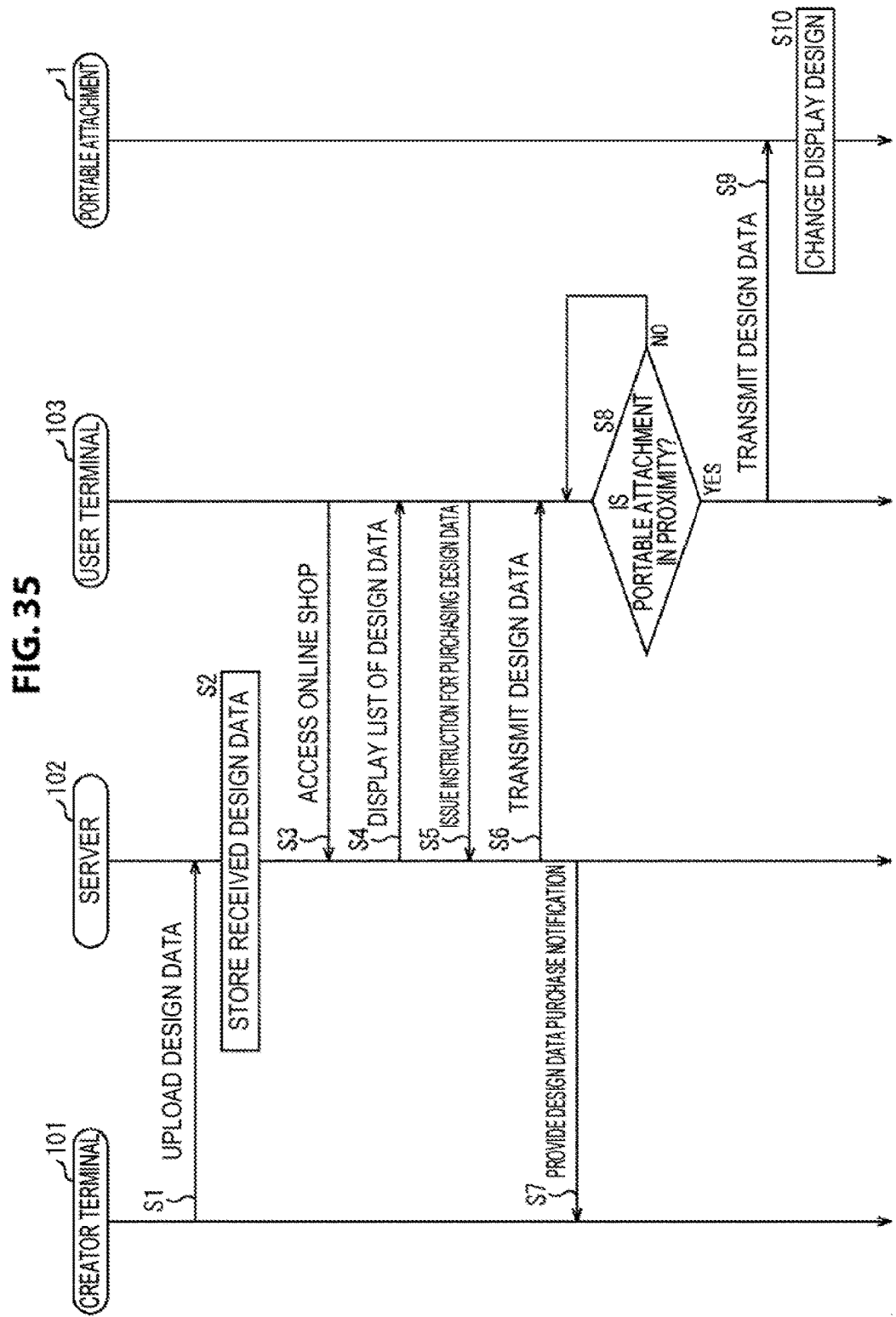
FIG. 35 is a flowchart illustrating a design providing process.

The design providing process to be executed by the design providing system of FIG. 34 will be described with reference to the flowchart of FIG. 35.

Also, in the description of FIG. 35, as described with reference to FIG. 32, it will be described that the user terminal 103 is the smartphone 91, the portable attachment 1 is the bangle 1A, and the user terminal 103 and the portable attachment 1 perform wireless communication using NFC communication.

Initially, the creator creates a design capable of being displayed by the portable attachment 1. In step S1, the creator terminal 101 uploads (transmits) created design data for the portable attachment 1 to the server 102 according to an operation of the creator.

In step S2, the server 102 receives design data transmitted from the creator terminal 101 and stores the received design data in an internal storage unit.

In step S3, the user terminal 103 accesses a site (an online shop) in which design data for the portable attachment 1 created by a large number of creators can be browsed and purchased by accessing a predetermined address of the server 102 from a browser or the like according to the user's operation.

In step S4, the server 102 transmits a webpage in which a list of design data for the portable attachment 1 created by a large number of creators is displayed to the user terminal 103 and causes the display of the user terminal 103 to display the list of design data in response to a request from the browser of the user terminal 103.

The server 102 can classify a large amount of design data stored in the internal storage unit into predetermined types and list and display the classified design data. As a unit of classification, for example, each type of the portable attachment 1 in which design data is used (a buckle, a T-shirt, a key holder, . . . ), each material shape (a sheet shape, a string shape, . . . ), each control format (one segment, two segments, two-dimensionally arrayed segments, . . . ), or the like can be selected.

When the user performs an operation of viewing a list of design data and purchasing desired design data, purchase instruction information of design data on which a purchase operation has been performed is transmitted from the user terminal 103 to the server 102 in step S5.

In step S6, the server 102 receives the purchase instruction information of the design data from the user terminal 103 and transmits the designated design data to the user terminal 103. The user terminal 103 receives the design data transmitted from the server 102 and stores the received design data in the internal storage unit.

Further, in step S7, the server 102 transmits a purchase notification indicating that the design data of the creator has been purchased to the creator terminal 101 uploading the purchased design data.

When the server 102 transmits the purchase notification of the design data to the creator terminal 101, it is possible to transmit purchaser information indicating a user purchasing the design data of the creator such as whether the user is male or female or an age range of the user (teens, twenties, or the like) on the basis of, for example, login information, registration information, or the like of the user.

Also, when the server 102 can acquire position information of the user terminal 103 or the like, position information about a position at which the design data of the creator has been downloaded, etc. can also be provided to the creator.

The user performs an operation of bringing the portable attachment 1 on which the downloaded design (data) is desired to be displayed in proximity to the user terminal 1. The user terminal 103 determines whether the portable attachment 1 is in proximity in step S8 and iterates the process of step S8 until it is determined that the portable attachment 1 is in proximity.

When it is determined that the portable attachment 1 is in proximity in step S8, the process proceeds to step S9 and the user terminal 103 transmits the design data to the portable attachment 1 using wireless communication.

In step S10, the portable attachment 1 receives design data transmitted from the user terminal 103 using the wireless communication and changes the display design. That is, the received design data is supplied to the drive control unit 13 and the drive control unit 13 causes the display body 11 to display an image based on the received design data.

According to the above design providing process, the user can purchase a desired display design and change the display design (image) of his/her portable attachment 1.

The design data downloaded from the server 102 is stored within the user terminal 103 and the user may change the display design (image) according to his/her mood or state on that day.

According to the design providing process, the creator can know when his/her created design has been purchased (downloaded), a purchasing user, and a purchase place in real time.

Also, statistical information such as the number of currently downloaded cases and the number of downloaded cases for a predetermined period such as a week or a month as well as real-time information at the time of a purchase may also be known if necessary.

Because not only can the user purchase desired design data, but the creator can also know a change in a temporal or spatial use state of his/her created design, the user and the creator can interactively create a community and sympathy is formed between the user and the creator.

It is possible to provide a service (a system) in which both the user and the creator want to participate by giving the creator welcome feedback as well as providing design data to the user.

Also, although the case in which the user purchases the design data created by the creator has been described in this example, a system in which the user can acquire and use the design data without payment may be provided.

Also, in addition to the acquisition and use of the design data created by the creator, the user may create a design to be displayed on his/her portable attachment 1 and transmit the created design to the portable attachment 1 to freely make a change according to a time, place, and occasion (TPO).

If the user creates the design of his/her portable attachment 1, segment data corresponding to (the display body 11 of) the portable attachment 1 is combined with the portable attachment 1, for example, when the user purchases the portable attachment 1. Alternatively, the user has access from the user terminal 103 to the server 102 storing segment data corresponding to various types of portable attachments 1 and downloads (acquires) the segment data of the portable attachment 1 possessed by the user to the user terminal 103. The segment data is data including information about a segment configuration of the display body 11 of the portable attachment 1, specifically, a shape of a segment, the number of segments, and an arrangement of segments, etc.

An application for designing a display pattern on the basis of segment data and creating design data is installed in the user terminal 103. This application may be pre-stored in the user terminal 103 or the user may acquire the application by downloading it from a predetermined server. Also, the server storing this application may be the same as or different from the server 102 storing the segment data or the design data created by the creator.

The user activates the application for creating the design data on the user terminal 103 and creates a design of his/her portable attachment 1. The created design data is transmitted to the portable attachment 1 as described with reference to FIGS. 32 and 33. Thereby, the user can change the display (the image) of the display body 11 of the portable attachment 1 to his/her created design.

Figure 36:
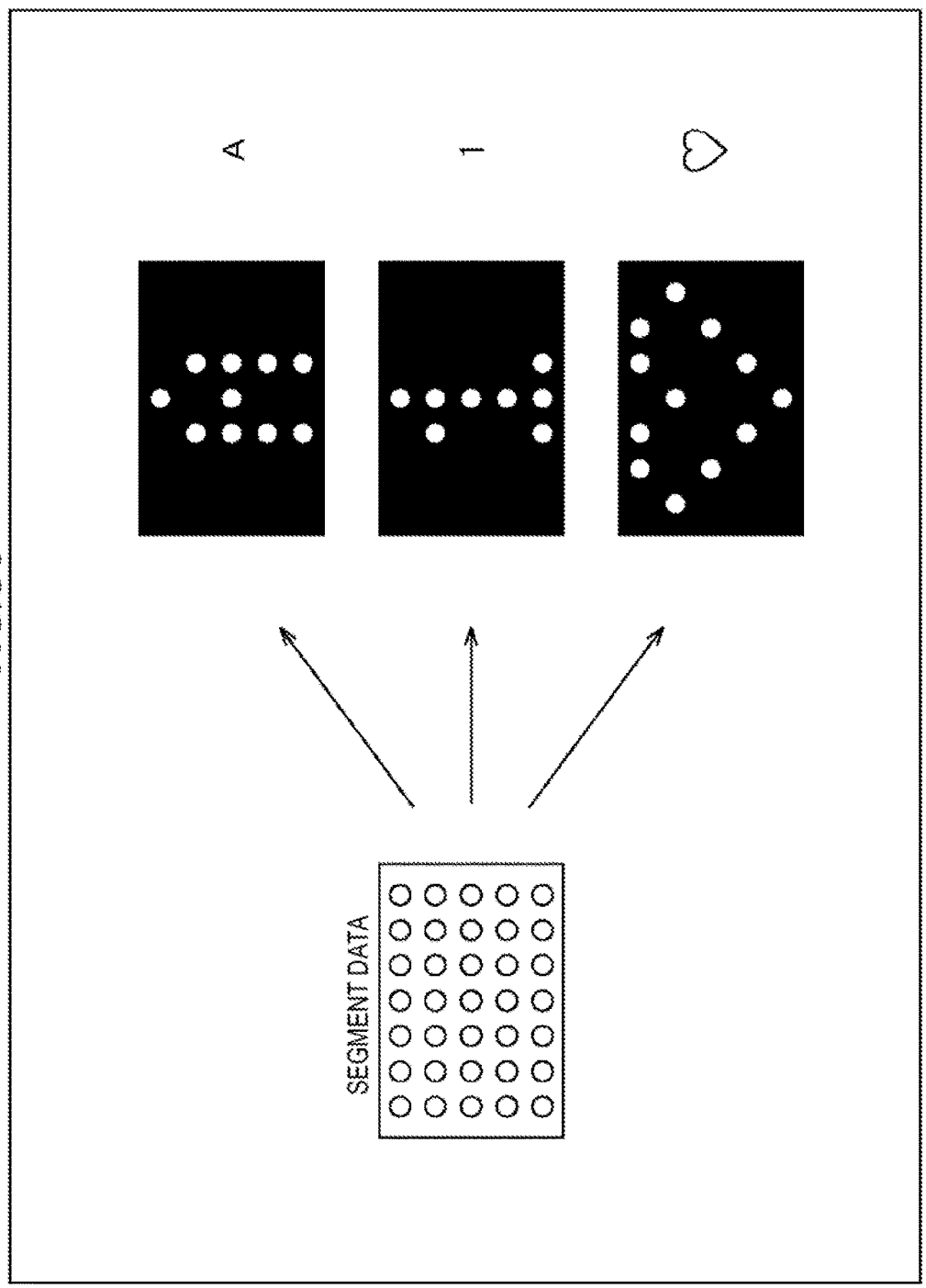
FIG. 36 is a diagram illustrating an example in which the user creates design data.

FIG. 36 illustrates an example of a part of segment data when the display body 11 of the portable attachment 1 is configured in a dot pattern and a design (a display pattern) capable of being created using the data.

It is possible to represent a character, a graphic, a symbol, etc. by turning on or off a dot (a segment) of a predetermined position. In FIG. 36, display examples in which the characters "A" and "1" and a heart symbol are represented by ON/OFF states of dots are illustrated.

Figure 37:
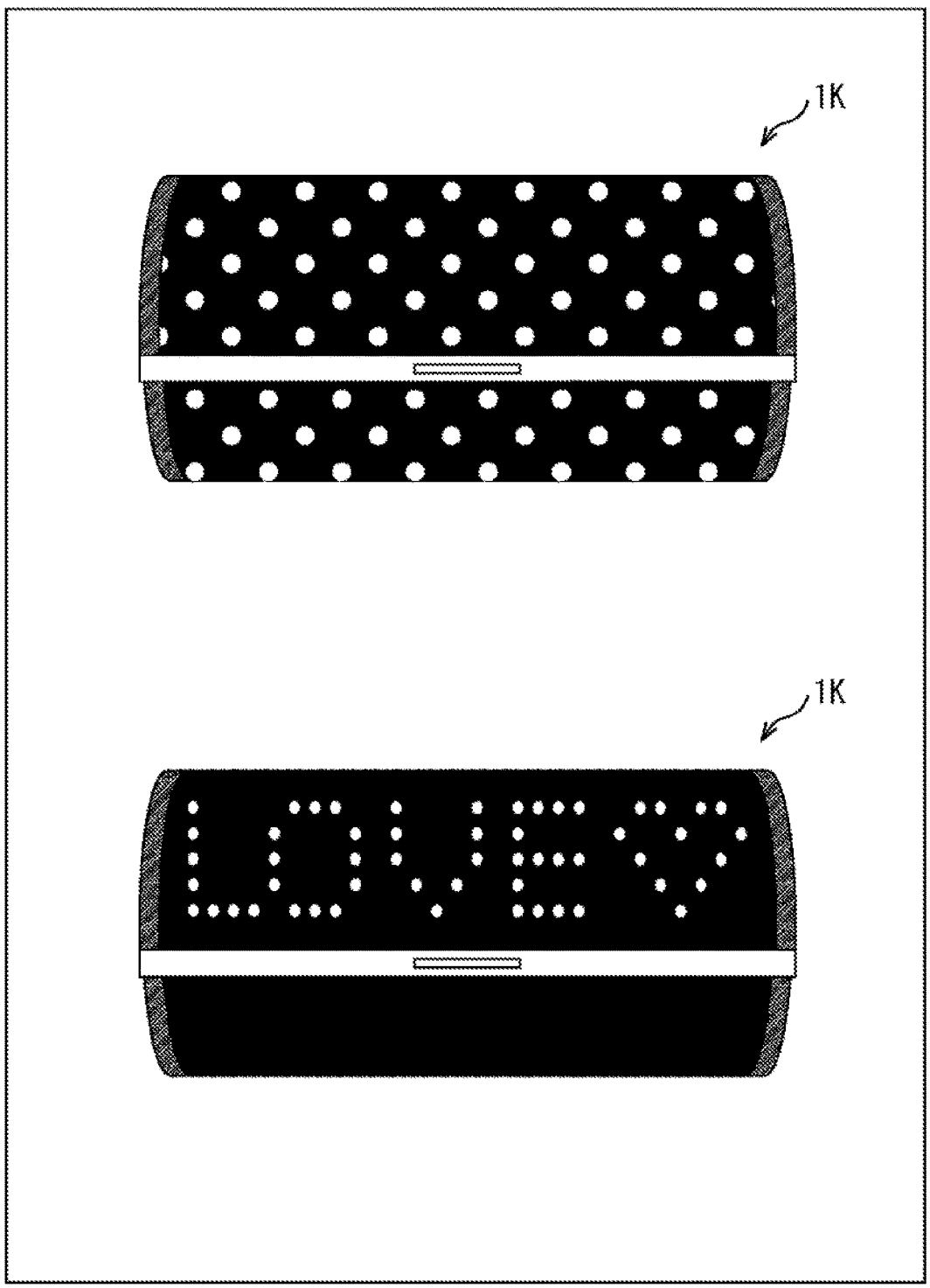
FIG. 37 is a diagram illustrating an example in which the user creates design data.

FIG. 37 illustrates an example in which design data created by the user is transmitted to a bag 1K serving as the portable attachment 1 and the transmitted design is displayed when segment data of a dot pattern illustrated in FIG. 36 is data for the bag 1K illustrated in FIGS. 15 and 17.

The user can upload his/her created design data to the server 102 and provide the design data to other users with or without payment. Also, the user can download design data uploaded by another user and change (edit) the design to his/her desired design using an application of creating design data. According to this design providing system, any user can be a creator.

Configuration Block Diagram of Terminal Apparatus

Figure 38:
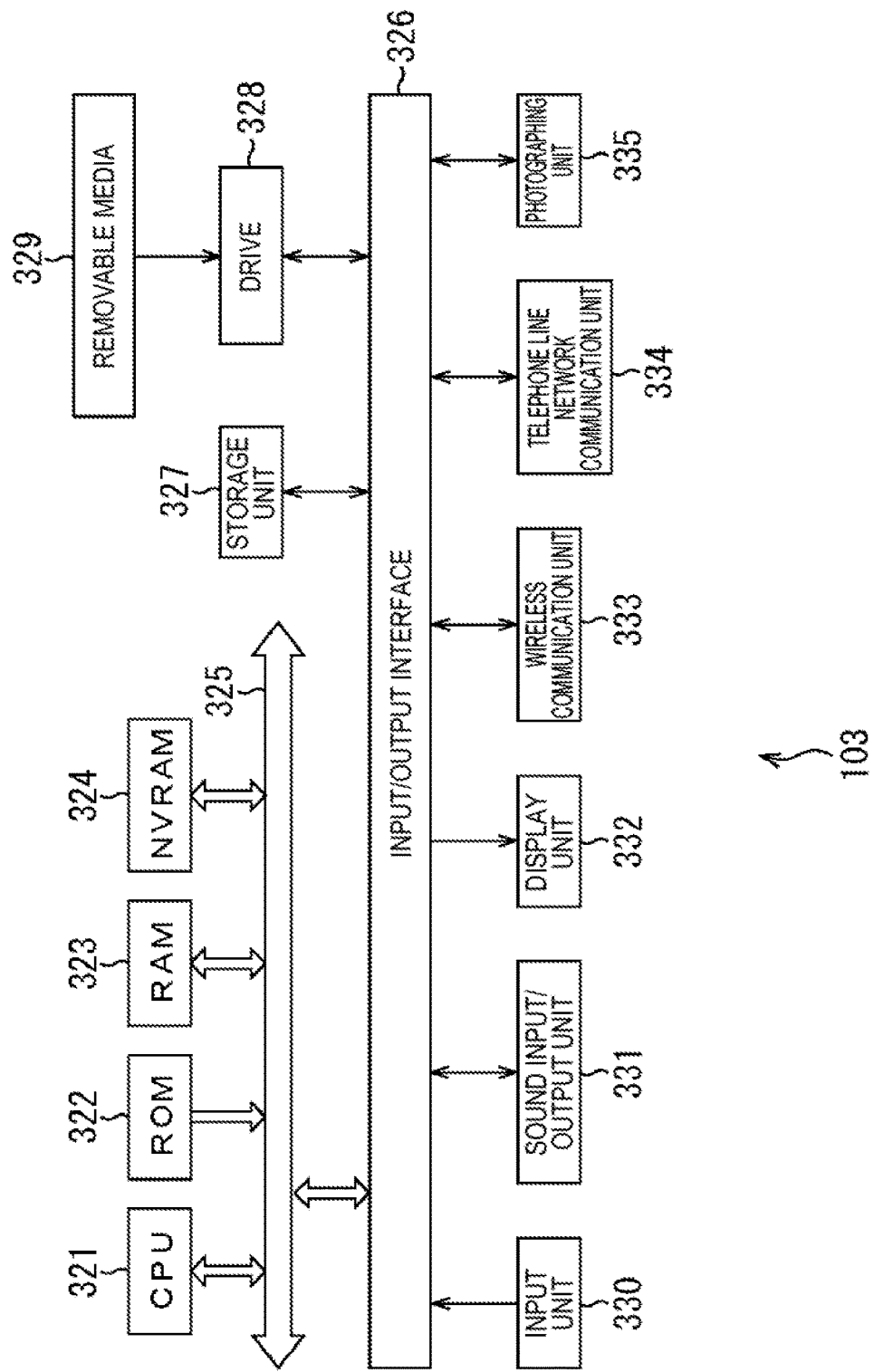
FIG. 38 is a configuration block diagram of a terminal apparatus.

FIG. 38 is a block diagram illustrating a configuration example of the user terminal 103 when the user terminal 103 is constituted of a smartphone.

A CPU 321 is an arithmetic processing unit which executes various types of processes. The CPU 321 functions as a design data creation unit by executing an application program of creating and editing design data on the basis of segment data.

The CPU 321 is mutually connected with a read only memory (ROM) 322, a random access memory (RAM) 323, and a non-volatile RAM (NVRAM) 324 via a bus 325. An input/output interface 326 is also connected to this bus 325 and a storage unit 327 and a drive 328 are connected to the input/output interface 326.

A software program or data is pre-stored in the ROM 322. The software program or data stored in the ROM 322 or the storage unit 327 is loaded on the RAM 323 and the NVRAM 324. Also, data, etc. necessary for the CPU 321 to execute various types of processes is also appropriately stored in the RAM 323 and the NVRAM 324. The storage unit 327 includes a flash memory, a hard disk, or the like and stores at least the application program for creating and editing design data.

The drive 328 reads data from removable media 329 such as a semiconductor memory mounted when necessary and supplies the read data to the CPU 321 via the input/output interface 326 or the like or writes data supplied from the CPU 321 to the removable media 329. The written data includes design data, segment data, data of an installed program (an application), etc.

An input unit 330, a sound input/output unit 321, a display unit 332, a wireless communication unit 333, a telephone line network communication unit 334, and a photographing unit 335 are connected to the input/output interface 326.

The input unit 330 includes an operation button, a touch panel, etc. and receives an input from an operation of the user to supply the input to the CPU 321 or the like. The sound input/output unit 331 includes a speaker, a microphone, etc. and a sound for communication is input thereto. The display unit 332 includes a liquid crystal display (LCD), an organic electro luminescence (EL) display, etc. and displays a predetermined image (screen).

The wireless communication unit 333 includes at least an NFC communication function of performing contactless communication using electromagnetic induction at a near distance of about several cm. In addition to the NFC communication function, the wireless communication unit 333 can have a plurality of wireless communication functions such as a wireless communication function based on a Wireless Fidelity (WiFi) scheme, a wireless communication function based on a Bluetooth (registered trademark) scheme, and an infrared communication function.

The telephone line network communication unit 334 performs voice communication or packet communication with another apparatus via a mobile phone communication network. The photographing unit 335 is constituted of a photographing element such as a charge coupled device (CCD), complementary mental oxide semiconductor (CMOS) sensor, or the like. The photographing unit 335 photographs a subject and supplies image data of the photographed subject to the CPU 321, etc. via the input/output interface 326.

When the user terminal 103 is constituted of a smartphone, the following configuration can be provided.

Although the case in which the user terminal 103 and the portable attachment 1 perform wireless communication using NFC communication in the above-mentioned example, a different use method is possible if a communication scheme in which communication apparatuses need not be in proximity to each other is used.

For example, clothing 1D illustrated in B of FIG. 30 can be used so that the clothing 1D is worn by an audience or an artist at a concert venue and a pattern of the clothing 1D (an image of the display body 11) is changed according to a tune using a radio operation. It is also possible to change the color or the pattern of the clothing 1D according to a song sung by the artist or light of a stage or change the pattern of the clothing 1D according to a song, a shout, or action of the artist. For example, the color or the pattern of the clothing 1D of the artist and the color or the pattern of the bangle 1A attached to the bodies of an audience may be linked by wireless communication and changed. Portable attachments 1 attached to the bodies of the artist and the audience may be of the same type (e.g., the bangle 1A) or of different types (e.g., the clothing 1D and the bangle 1A).

5. Example of Display Body of Three-Dimensional Shape

Display Body of Three-Dimensional Shape

Figure 39:
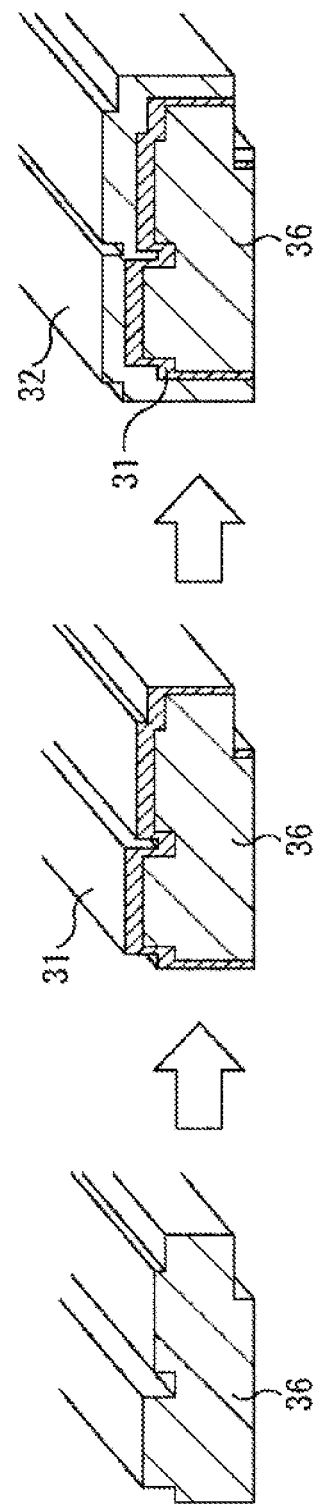
FIG. 39 is a diagram illustrating a method of manufacturing a display body with a three-dimensional shape.

The display body 11 can be three-dimensionally manufactured in a method illustrated in FIG. 39.

First, the electrode layer 36 of a complex shape is initially three-dimensionally formed by cutting, casting, or the like. Next, the micro-encapsulation layer 31 is added to the surface of the electrode layer 36 by immersion of micro-capsule fillers, spray coating, or the like. Next, the transparent electrode layer 32 is formed to cover the micro-encapsulation layer 31 by vapor deposition or the like.

Figure 40:
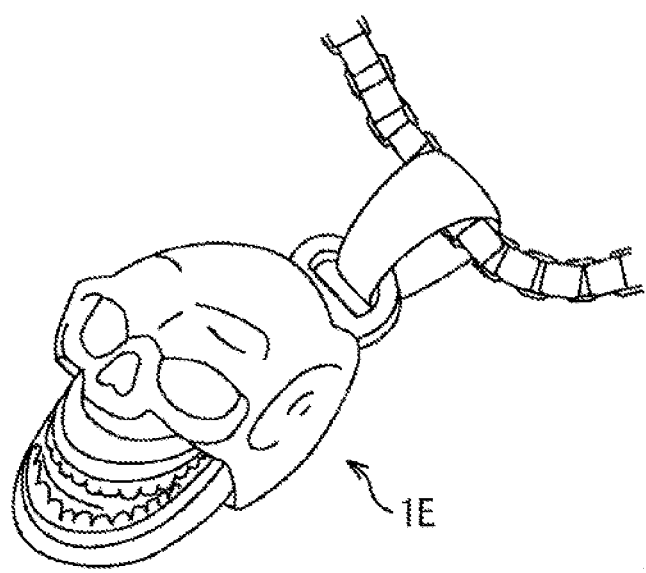
FIG. 40 is a diagram illustrating an example of a portable attachment using the manufacturing method of FIG. 38.

In this process, for example, as illustrated in FIG. 40, it is possible to three-dimensionally manufacture a pendant 1E serving as the portable attachment 1.

If the micro-encapsulation layer 31 or the transparent electrode layer 32 is added to the electrode layer 36 of a previously molded three-dimensional shape, display irregularity of the display unit 11 is caused by non-uniformity of the film thickness when a predetermined color is displayed because non-uniformity (film formation irregularity) occurs in the film thickness of the micro-encapsulation layer 31 or the transparent electrode layer 32 according to a three-dimensional shape of the electrode layer 36. However, this display irregularity (color irregularity) can also be used as one element having high fashionability and the portable attachment 1 having high fashionability can be manufactured.

As described above, the portable attachment 1 includes the display body 11 constituted of an electrophoretic display, and is an article carried or worn by the user (the human) and can display a desired image (design) with flexibility and low power consumption.

6. Application Examples Applied to Various Types of Articles

Hereinafter, application examples in which the above-mentioned portable attachment 1 is applied to various types of articles will be described.

Application Example of Tie

First, an application example in which the above-mentioned portable attachment 1 is a tie will be described.

The tie serving as the portable attachment 1 includes at least one of the switch unit 12 (FIG. 8), the sensor 141 (FIG. 12), and the communication unit 81 (FIG. 31) and executes the action detection function described with reference to FIG. 9 or the state change detection function described with reference to FIG. 13.

The tie includes a pressure detection sensor such as a piezoelectric element which detects bending of the tie as the sensor 141. The drive control unit 13 controls the display body 11 to change the color or the pattern of the tie when the tie has been bent on the basis of a detection result of the pressure detection sensor.

Also, for example, the pressure detection sensor detects the strength of fastening when the user has connected the tie and the drive control unit 13 can control the display body 11 to change the color or the pattern of the tie according to the strength of fastening or in the case of strength greater than or equal to fixed strength.

The tie includes an image sensor such as a CCD or CMOS image sensor as the sensor 141. The image sensor is installed at a position at which the color of a shirt worn by the user can be detected, for example, when the tie is worn. The drive control unit 13 controls the display body 11 to change the color or the pattern of the tie according to the color or the pattern of a shirt detected by the image sensor. The color or pattern of the shirt and the color or the pattern of the tie displayed on the display body 11 can be pre-associated and stored and the internally stored colors or patterns may be randomly selected and displayed.

Also, the tie includes an operation button serving as the switch unit 12 and the drive control unit 13 can control the display body 11 to change the color or the pattern of the tie every time the user performs the button operation.

Also the following attachment guide function can be added to the tie. When the attachment guide function is turned on by pressing the operation button, the display of a portion indicating a knot position when the tie is tied in the display body 11 is changed as illustrated in A of FIG. 41. Thereby, the user can always tie the tie at a length suitable for him/her. A function in which the user can set (select) which position of the display body 11 is displayed as a knot position may be added.

Figure 41:
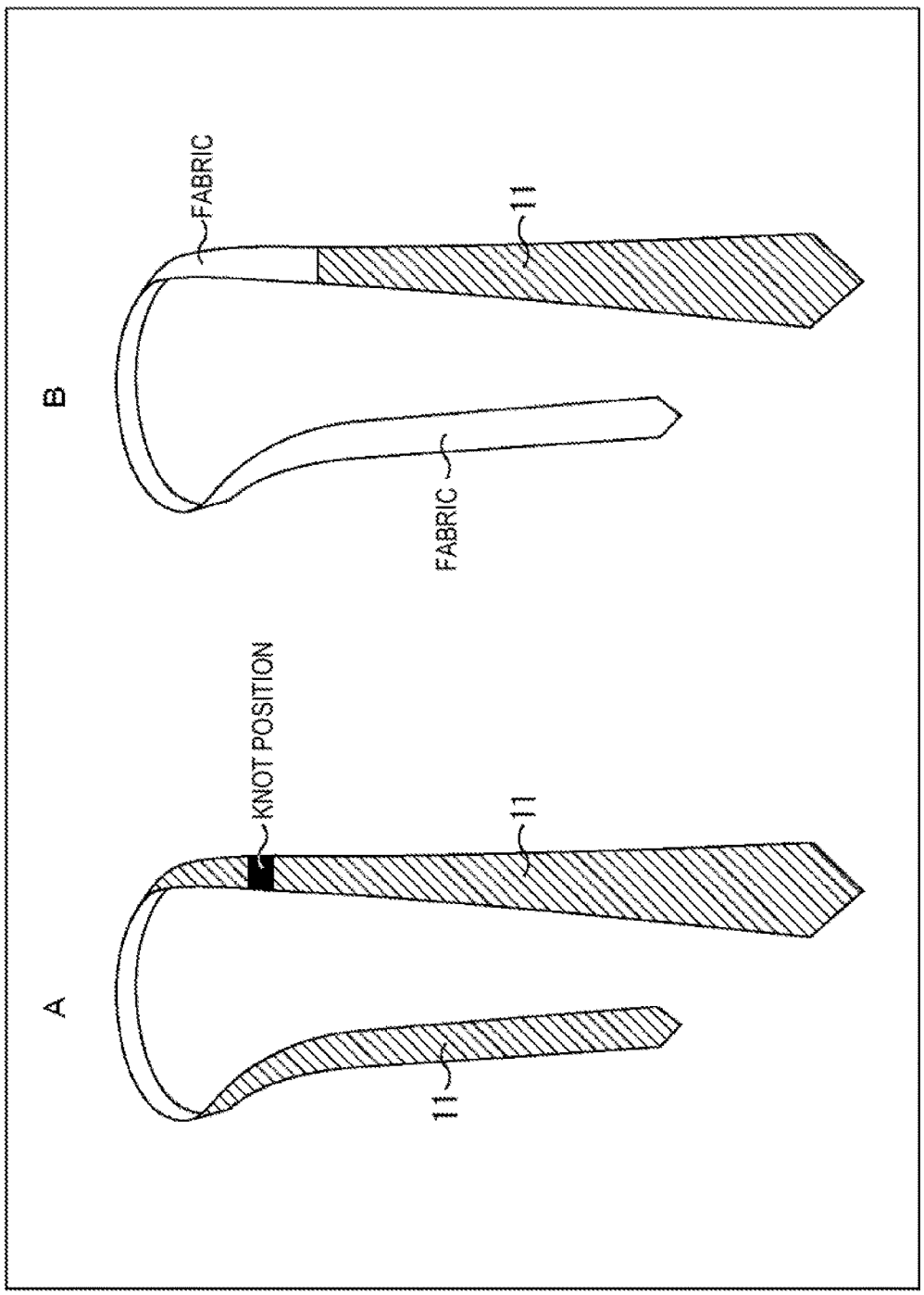
FIG. 41 is a diagram illustrating an application example when the portable attachment is a tie.

The display unit 11 of the tie may serve as the entire surface of a front side as illustrated in A of FIG. 41 and may be only a visible portion of the front when the tie is tied and worn as illustrated in B of FIG. 41.

Figure 42:
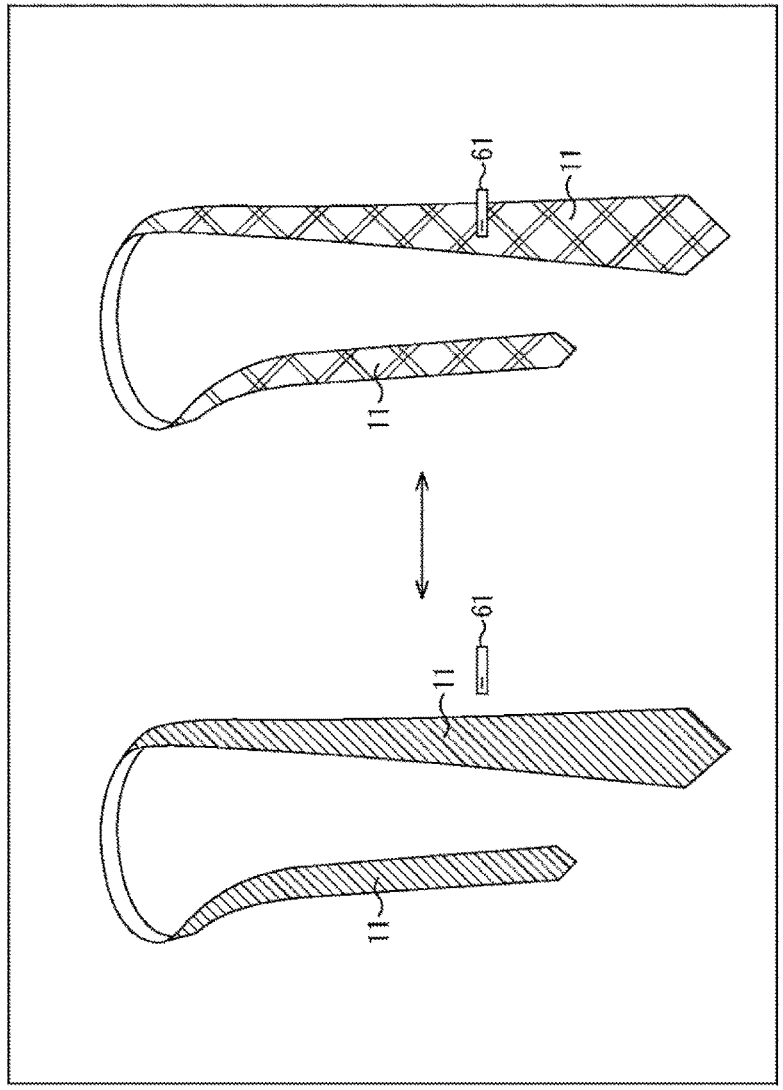
FIG. 42 is a diagram illustrating an application example when the portable attachment is a tie.

As described with reference to FIG. 25, a configuration in which the tie is separated into the display body 11 and the control terminal 61 which controls the drive of the display body 11 can be adopted. In this case, for example, as illustrated in FIG. 42, the color or the pattern of the display body 11 can be controlled to be changed according to whether a tie pin is pinched by the tie pin serving as the control terminal 61. Also, a plurality of types of tie pins having the function of the control terminal 61 are prepared and it is also possible to change the color or the pattern of the display body 11 using the tie pin to pinch the tie.

The tie includes a communication function described with reference to FIG. 31 and can change the design in conjunction with the bag 1H (FIG. 22) or the bangle 1A (FIG. 3) serving as the portable attachment 1 including the same communication function or the like. For example, when the color or the pattern of the display body 11 of the tie is changed by a button operation or the like, related content (information for specifying the design) is transmitted to the bag 1H, the bangle 1A, or the like. The bag 1H or the bangle 1A receives information transmitted from the tie and the display of the bag 1H or the bangle 1A is changed to the same design as a design displayed on the tie. Alternatively, the design of the bag 1H or the bangle 1A is changed to a design corresponding to the displayed design of the tie.

Application Example of Glasses

Next, the application example in which the above-mentioned portable attachment 1 is glasses will be described.

The glasses serving as the portable attachment 1 include at least one of the switch unit 12 (FIG. 8), the sensor 141 (FIG. 12), and the communication unit 81 (FIG. 31). Also, when the glasses serve as the portable attachment 1, a frame part is constituted of the display body 11 and the color or the pattern of the frame part of the glasses is changed by the action detection function described with reference to FIG. 9 or the state change detection function described with reference to FIG. 13.

For example, the glasses include the image sensor such as a CCD or CMOS image sensor as the sensor 141. The image sensor photographs the perimeter of the glasses. The drive control unit 13 detects a gaze direction of another user on the basis of a captured image. The drive control unit 13 controls the display body 11 to change the color or the pattern of the glasses when the user wearing the glasses has been viewed by other user.

Also, the drive control unit 13 recognizes the color of a peripheral place on the basis of the captured image and controls the display body 11 to display a color opposite to the recognized color or a complementary color. For example, when the glasses are placed on a black table, the display body 11 is controlled to be white. Thereby, it is possible to cause the user to easily know a place in which the glasses are placed.

The drive control unit 13 detects a surface state of the skin of the user wearing the glasses, for example, a shine state (an amount of sebum), from the image detected by the image sensor, and controls the color of the display body 11 to be changed according to the detected state. The glasses represent the detected surface state of the skin as a degree of fatigue in the color of the display body 11. Alternatively, the drive control unit 13 changes the gradation of the display body 11 in the order of "black"→"gray"→"white" according to a time at which the glasses are worn.

The image sensor images a gesture performed by the user as a display change instruction. The drive control unit 13 recognizes the imaged gesture and changes the color or the pattern of the display body 11 according to a type of gesture performed by the user.

The glasses include a state detection sensor which detects a bent state of an ear-hook part of the glasses frame (a temple) as the sensor 141. The state detection sensor can be implemented by, for example, a contact point detection sensor, a light receiving sensor, or the like. The drive control unit 13 changes the color or the pattern of the display body 11 in a state in which the ear-hook part is bent and a state in which the ear-hook part is not bent.

The glasses include an operation button serving as the switch unit 12 and the drive control unit 13 can change the color or the pattern of the display body 11 of the frame part every time the user presses the operation button. If the color or the pattern of the frame is changed in a state in which the user is wearing the glasses, it is difficult to know a changed pattern. Therefore, if the color or the pattern of the frame is changed, a function of allowing the user to know the current color or pattern through a sound (a message or a melody), light, vibration, or the like can be added.

The glasses include a microphone which detects an ambient sound as the sensor 141. The drive control unit 13 controls the display body 11 to change the color or the pattern of the glasses according to a volume detected by the microphone or when a volume greater than or equal to a fixed volume has been detected.

The glasses include the communication unit 81 and can detect another communication device within a predetermined range. For example, a plurality of users are assumed to wear the same type of glasses having a communication function. The drive control unit 13 controls the display body 11 so that the color or the pattern of the glasses is changed when the number of other communication devices detected by the communication unit 81 is greater than or equal to a predetermined number. Thereby, when a predetermined number of users having the same communication device are gathered within a predetermined range, the color or the pattern of the glasses is changed.

Application Example of Wallet

Next, the application example in which the above-mentioned portable attachment 1 is a wallet will be described.

The wallet serving as the portable attachment 1 includes one or more of the switch unit 12 (FIG. 8), the sensor 141 (FIG. 12), and the communication unit 81 (FIG. 31). Also, at least a part of an outside of the wallet is constituted of the display body 11 and a color or a pattern of the outside is changed by the action detection function described with reference to FIG. 9 or the state change detection function described with reference to FIG. 13.

For example, the wallet includes a tension detection sensor which detects the tension or a weight detection sensor which detects the weight as the sensor 141, and detects an amount of money in the wallet by the weight, the tension of the wallet (a degree of swelling), or the like. The drive control unit 13 changes the color or the pattern of the display body 11 of the outside on the basis of the detected amount of money.

Also, the wallet includes the communication unit which performs NFC communication. The communication unit 81 can read the balance (an amount of charged money) of an integrated circuit (IC) card for electronic money (hereinafter referred to as a money IC card) known as Suica (registered trademark) or the like.

The communication unit 81 reads the balance of the money IC card in the wallet using NFC communication. The drive control unit 13 changes the color or the pattern of the display body 11 if the balance detected by the communication unit 81 is less than or equal to a predetermined amount of money. Thereby, for example, if the color of the display body 11 of the wallet changes after payment by the money IC card within the wallet at a ticket gate of a station or a shop, the user who is the owner of the wallet can know that the balance has been reduced. The remaining amount of money may be directly displayed by providing, for example, seven segment areas or an active matrix control area, in a display portion of the wallet.

Also, when the balance is greater than or equal to a predetermined amount of money, an image indicating that there is much money, for example, an image of a ten thousand yen bill, an image in which a predetermined character is smiling while counting money, or the like, may be displayed.

Further, if the communication unit 81 includes a communication function using a wireless LAN or a portable phone communication network instead of an NFC communication function, it is possible to transmit a result of reading the balance of the money IC card in the wallet to another communication apparatus such as a smartphone. This function can be applied to, for example, a service for allowing parents to know balance information of the money IC card within the wallet of a child by transmitting the balance information to smartphones of the parent, etc.

If the wallet includes an acceleration sensor which detects vibration, etc. as the sensor 141 in addition to the NFC communication function, for example, it is possible to detect an operation of a user bumping (hitting) the wallet. For example, if payment for a drinking event is performed, the communication unit 81 reads the balance of the money IC card in the wallet of each user when the wallet of each of a plurality of users is bumped by setting an operation mode to a certain operation mode according to a button operation. The drive control unit 13 calculates an amount of money to be paid by each user using unbalanced allocation according to the balance of each user and causes the display body 11 to display the calculated amount of money. Alternatively, if it is possible to input an amount of money to be paid or transmit an amount of money to be paid from the smartphone or the like, the communication unit 81 detects the number of users by detecting the number of communication devices within a predetermined distance. The drive control unit 13 evenly divides an amount of money to be paid by the number of users and causes the display body 11 to display the evenly divided amount of money.

The communication unit 81 reads a deadline of an electronic commutation ticket of an IC card type. If the deadline of the electronic commutation ticket is within a predetermined period, the drive control unit 13 notifies the user of that fact by changing a color or a pattern of the display body 11 or displaying a message.

If the number of spaces (card pockets) into which a card is inserted in the wallet is two or more and a space into which the money IC card is inserted is predetermined, the communication unit 81 reads the balance of the money IC card when the money IC card is inserted into a predetermined space. The drive control unit 13 causes the display unit 11 to display the balance of the money IC card.

If various types of cards such as a credit card, a membership card, and a point card include an NFC communication function and tag information for identifying a type of card can be transmitted and received from each card using the NFC communication, the communication unit 81 identifies a card in a card pocket within the wallet. The drive control unit 13 causes the display body 11 to display information indicating a type of card in the wallet. Thereby, the user can know which card is in the wallet.

A design card for designating a design to be displayed on the display body 11 of the wallet is provided. The communication unit 81 detects the design card in the card pocket of the wallet, for example, using NFC communication. The drive control unit 13 controls the display body 11 to display a design corresponding to the design card in the card pocket in the wallet. The user can change the design of the wallet, for example, by changing the design card according to his/her mood that day. The design card may have a coin shape or the like as well as a card shape.

Another communication device such as a smartphone can be registered in the communication unit 81. If the user walks while simultaneously carrying the smartphone and the wallet, the communication unit 81 detects whether the registered communication device is within a predetermined distance when the smartphone is registered in the communication unit 81. The drive control unit 13 controls the drive of the display body 11 on the basis of a detection result of the communication unit 81. For example, if the user has lost the wallet, the wallet and the smartphone are placed in separated places. When the registered smartphone has not been detected within a predetermined distance, the drive control unit 13 causes the display body 11 to display a name or a contact address of a user who is the owner.

If the wallet is a long wallet, a part of the wallet projects from a pocket of pants when a man places the wallet in the pocket. The wallet is provided with a brightness detection sensor (an illuminance sensor) which detects ambient brightness as the sensor 141 in each place of the display body 11. The brightness detection sensor detects a portion of the wallet projecting from the pocket. The drive control unit 13 displays a picture of an animal or changes a color or a pattern only for the projecting portion of the display body 11. If the user can designate the color of the pants or the sensor can detect the color of the pants, the projecting portion of the display body 11 can be changed to be suitable for the detected color of the pants.

Application Example of Key/Key Holder

Next, an application example in which the above-mentioned portable attachment 1 is a key or a key holder attached to the key will be described.

The key (or the key holder) serving as the portable attachment 1 includes one or more of the switch unit 12 (FIG. 8), the sensor 141 (FIG. 12), and the communication unit 81 (FIG. 31). Also, a part of the key is constituted of the display body 11 and a color or a pattern can be changed by the action detection function described with reference to FIG. 9 or the state change detection function described with reference to FIG. 13.

The key includes the communication unit 81 which performs NFC communication and an NFC communication function is also provided in a door side to which a lock capable of being unlocked by the key is attached. In this case, when the user has performed locking or unlocking using the key, the communication unit 81 detects this operation by communicating with the NFC communication unit of the door. The drive control unit 13 changes a color or a pattern of the display body 11 in a locked state and an unlocked state. Thereby, the user can confirm whether the door has been locked by the key and avoid forgetting to close the door by merely viewing the color or the pattern displayed on the display body 11 of the key.

Application Example of Clothing

Next, an application example in which the above-mentioned portable attachment 1 is clothing will be described.

The clothing serving as the portable attachment 1 includes one or more of the switch unit 12 (FIG. 8), the sensor 141 (FIG. 12), and the communication unit 81 (FIG. 31). Also, at least a part of fabric of the clothing is constituted of the display body 11 and a color or a pattern of the clothing can be changed by the action detection function described with reference to FIG. 9 or the state change detection function described with reference to FIG. 13.

For example, the clothing serving as the portable attachment 1 includes a human body communication function of performing communication using a human body as a communication medium as the communication unit 81. Examples of a communication scheme of the human body communication are various types of communication schemes such as an electric field scheme of forming an electric field around two electrodes equivalent to a capacitor and transferring information using a change in the electric field and an electric current scheme of outputting a weak electric current and modulating the electric current to transfer information. The communication scheme of the human body communication is not limited to any scheme and any communication scheme using the human body as the communication medium may be used.

When two users wearing clothing having the human body communication function come in contact by, for example, shaking hands or the like, the electrical conduction between the communication units 81 of the clothing worn by the two users is detected. The drive control unit 13 changes the color or the pattern of the display body 11 on the basis of information indicating the detection of the electrical conduction from the communication unit 81.

The clothing includes an acceleration sensor which detects vibration or the like as the sensor 141. For example, when the user wearing the clothing jumps, the sensor 141 detects the jump and notifies the drive control unit 13 of the jump. For example, the drive control unit 13 can change the color of the display body 11 with every jump or make a change to a predetermined color only when motion has been detected.

The clothing includes a contact point detection sensor which detects whether the clothing is worn as the sensor 141. In this case, when the user is wearing the clothing and when the user has removed the clothing, the drive control unit 13 can change the color or the pattern to be displayed on the display body 11.

The clothing includes a microphone which detects an ambient sound as the sensor 141. The drive control unit 13 changes the color or the pattern to be displayed on the display body 11 according to a volume detected by the microphone or when a volume greater than or equal to a fixed volume has been detected. Also, the drive control unit 13 can change the color or the pattern to be displayed on the display body 11 according to a frequency of a sound detected by the microphone. Thereby, for example, it is possible to change the pattern of the clothing for a male and a female and change the color according to music.

When the clothing of each of the top (clothing worn on the upper body) and the bottom (clothing worn on the lower body) is clothing serving as the portable attachment 1 and includes a communication function, the drive control unit 13 controls the display body 11 of each piece of clothing so that the colors or the patterns of the top and the bottom are the same. Further, in conjunction with a bangle or the like serving as the portable attachment 1, the colors or the patterns of the clothing and the bangle may be controlled to be the same.

The clothing includes a touch sensor or a piezoelectric sensor which detects contact with the clothing (the fabric portion) as the sensor 141. For example, the touch sensor can be superimposed on a display plane of the display body 11 or can detect an area touched by the user. The drive control unit 13 changes the area of the display body 11 to a color or a pattern different from those of the other areas on the basis of a detection result from the touch sensor. Thereby, a color or a pattern of a place touched by the user is changed and the place touched by the user is known.

The clothing includes a temperature detection sensor which detects the temperature of the user wearing the clothing as the sensor 141. The drive control unit 13 controls the color to be changed according to the temperature of the user detected by the temperature detection sensor or controls the color to be changed when his/her body temperature is greater than or equal to a fixed temperature.

The clothing includes a humidity detection sensor which detects a sweat rate (humidity) of the user wearing the clothing as the sensor 141. The drive control unit 13 estimates the sweat rate of the user on the basis of a detection result of the humidity detection sensor and controls the drive of the display body 11 so that the color or the pattern is changed according to the sweat rate.

The clothing includes a heart rate detection sensor which detects a heart rate of the user wearing the clothing in an optical or electrical method as the sensor 141. The drive control unit 13 changes the color or the pattern of the display body 11 when the heart rate of the user is greater than or equal to a predetermined value on the basis of a detection result of the heart rate detection sensor. Also, the drive control unit 13 controls the drive of the display body 11 so that the color or the pattern is changed according to a change in the heart rate.

If the clothing is a type of clothing that closely fits the body when worn, it is possible to detect whether the clothing is brought into close contact with the body by providing the piezoelectric sensor, a sensor which detects electrical conduction, or the like. The drive control unit 13 controls the drive of the display body 11 so that a color or a pattern of a portion which is not brought into close contact with the body is changed. The clothing that closely fits the body when worn may be underwear.

If the clothing is clothing for a baby (e.g., underwear), it is possible to detect breathing or sweating of the baby by providing a heart rate detection sensor or a humidity detection sensor as the sensor 141. The drive control unit 13 controls the drive of the display body 11 so that a color or a pattern of the clothing is changed according to a detected state of breathing and a detected sweating rate of the baby.

As described above, the portable attachment 1 is applied to various articles carried or worn by the user (the human) and can cause the display body 11 to perform various representations.

Also, even in the above-described example in which the drive of the display body 11 is controlled to change the color among the above-described examples, it is possible to control the display body 11 to make a change in the pattern as well as a simple change in the color.

The present disclosure is not limited to the portable attachment carried or worn by the user, and for example, can also be applied to an interior of a curtain or the like, an exterior of a vehicle body, etc.

The disclosure is not limited to the embodiments described above, and various changes and modifications may be made without departing from the scope of the disclosure.

For example, a mode in which all or some of the above-mentioned plurality of embodiments are combined can be adopted.

For example, if a function is being performed in a certain apparatus on a network, the present disclosure can adopt a configuration of cloud computing which processes by allocating and connecting the function by a plurality of apparatuses through the network.

Further, if a plurality of processes described in the flowcharts are included in one step, the plurality of processes included in this one step can be executed by one apparatus or by allocating a plurality of apparatuses.

Steps written in the flowcharts accompanying this specification may of course be executed in a time series in the illustrated order, but such steps do not need to be executed in a time series and may be carried out in parallel or at necessary timing, such as when the processes are called.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

In addition, the effects described in the present specification are not limiting but are merely examples, and there may be effects other than the ones described herein.

Additionally, the present technology may also be configured as below.

(1)
A portable attachment that is an article including a display body made of an electrophoretic display, the article being carried or worn by a user.

(2)
The portable attachment according to (1), including:
a state detection unit configured to detect a predetermined state of the portable attachment,
wherein an applied voltage of the electrophoretic display is changed according to a detection result of the state detection unit.

(3)
The portable attachment according to (1) or (2), including:
an operation detection unit configured to detect an operation of the user,
wherein an applied voltage of the electrophoretic display is changed according to the operation of the user detected by the operation detection unit.

(4)
The portable attachment according to (1) or (2), including:
a communication unit configured to wirelessly communicate with another communication apparatus,
wherein an applied voltage of the electrophoretic display is changed according to a received signal received by the communication unit.

(5)
The portable attachment according to (4), wherein
the communication unit receives design data from the other communication apparatus, and
the applied voltage of the electrophoretic display is changed on the basis of the design data and thereby an image of the display body is changed.

(6)
The portable attachment according to (4) or (5), wherein
the communication unit extracts power from the received signal, and
the applied voltage of the electrophoretic display is changed using the extracted power.

(7)
The portable attachment according to any of (4) to (6), wherein the communication unit wirelessly communicates with the other communication apparatus using near field communication (NFC).

(8)
The portable attachment according to any of (1) to (7), wherein the portable attachment is a bag.

(9)
The portable attachment according to (8), wherein a shape of the bag is changeable to a polyhedral shape and a planar shape.

(10)
The portable attachment according to any of (1) to (9), wherein a film on which a predetermined pattern or character is drawn is attached to an upper surface of the electrophoretic display.

(11)
The portable attachment according to any of (1) to (10), wherein the display body includes a color filter on a surface side of the electrophoretic display

(12)
The portable attachment according to any of (1) to (11), wherein a control terminal including at least a drive control unit configured to control an applied voltage of the electrophoretic display is separated from the display body and a connection port of the control terminal is connected to an electrode layer of the electrophoretic display by the control terminal sandwiching the display body.

(13)

The portable attachment according to any of (1) to (12), wherein the display body of a strip shape or a string shape is woven.

(14)

The portable attachment according to any of (1) to (13), wherein the electrophoretic display has a plurality of segments.

(15)

The portable attachment according to (14), wherein the plurality of segments are arrayed in a two-dimensional array shape.

(16)

The portable attachment according to any of (3) to (7), (14), and (15), wherein the display body also performs display on a rear side of the electrophoretic display.

(17)

The portable attachment according to (16), wherein the display body includes a color filter on the rear side of the electrophoretic display.

(18)

A communication system including:
a portable attachment that is an article carried or worn by a user; and
a terminal apparatus, wherein
the portable attachment includes
a communication unit configured to wirelessly communicate with the terminal apparatus, and
a display body made of an electrophoretic display and configured to perform display based on design data received by the communication unit, and
the terminal apparatus transmits the design data to the communication unit.

(19)

The communication system according to (18), wherein the terminal apparatus further includes a design data creation unit configured to create the design data.

(20)

The communication system according to (19), wherein the design data creation unit creates the design data on the basis of segment data of the portable attachment.

REFERENCE SIGNS LIST 1 portable attachment
11 display body
12 switch unit
13 drive control unit
14 battery
35 color filter
32 transparent electrode layer
36 electrode layer
41A, 41B connection port
61 control terminal
81 communication unit
103 terminal apparatus
121 surface
141 sensor
151 surface
161 display unit
162 film
181 display unit
201 unit sheet
202 connection port

The invention claimed is:

1. A portable attachment that is an article including a display body made of an electrophoretic display, the article being carried or worn by a user, the portable attachment comprising:
a state detection unit configured to detect a predetermined state of the portable attachment,
wherein an applied voltage of the electrophoretic display is changed according to a detection result of the state detection unit, such that a time interval between changes of the applied voltage is changed in response to a detection that a capacity of a battery of the portable attachment is less than or equal to a predetermined level.

2. The portable attachment according to claim 1, comprising:
an operation detection unit configured to detect an operation of the user,
wherein an applied voltage of the electrophoretic display is changed according to the operation of the user detected by the operation detection unit.

3. The portable attachment according to claim 1, comprising:
a communication unit configured to wirelessly communicate with another communication apparatus,
wherein an applied voltage of the electrophoretic display is changed according to a received signal received by the communication unit.

4. The portable attachment according to claim 3, wherein the communication unit receives design data from the other communication apparatus, and
the applied voltage of the electrophoretic display is changed on the basis of the design data and thereby an image of the display body is changed.

5. The portable attachment according to claim 3, wherein the communication unit extracts power from the received signal, and
the applied voltage of the electrophoretic display is changed using the extracted power.

6. The portable attachment according to claim 3, wherein the communication unit wirelessly communicates with the other communication apparatus using near field communication (NFC).

7. The portable attachment according to claim 1, wherein the portable attachment is a bag.

8. The portable attachment according to claim 7, wherein a shape of the bag is changeable to a polyhedral shape and a planar shape.

9. The portable attachment according to claim 1, wherein a film on which a predetermined pattern or character is drawn is attached to an upper surface of the electrophoretic display.

10. The portable attachment according to claim 1, wherein the display body includes a color filter on a surface side of the electrophoretic display.

11. The portable attachment according to claim 1, wherein a control terminal including at least a drive control unit configure to control an applied voltage of the electrophoretic display is separated from the display body and a connection port of the control terminal is connected to an electrode layer of the electrophoretic display by the control terminal sandwiching the display body.

12. The portable attachment according to claim 1, wherein the display body of a strip shape is woven.

13. The portable attachment according to claim 1, wherein the electrophoretic display has a plurality of segments.

14. The portable attachment according to claim 13, wherein the plurality of segments are arrayed in a two-dimensional array shape.

15. The portable attachment according to claim 1, wherein the display body also performs display on a rear side of the electrophoretic display.

16. The portable attachment according to claim 15, wherein the display body includes a color filter on the rear side of the electrophoretic display.

17. A communication system comprising:
a portable attachment that is an article carried or worn by a user; and
a terminal apparatus, wherein
the portable attachment includes
a communication unit configured to wirelessly communicate with the terminal apparatus,
a display body made of an electrophoretic display and configured to perform display based on design data received by the communication unit, and
a state detection unit configured to detect a predetermined state of the portable attachment,
wherein an applied voltage of the electrophoretic display is changed according to a detection result of the state detection unit, such that a time interval between changes of the applied voltage is changed in response to a detection that a capacity of a battery of the portable attachment is less than or equal to a predetermined level, and
the terminal apparatus transmits the design data to the communication unit.

18. The communication system according to claim 17, wherein the terminal apparatus further includes a design data creation unit configured to create the design data.

19. The communication system according to claim 18, wherein the design data creation unit creates the design data on the basis of segment data of the portable attachment.

* * * * *